United States Patent
Burke

(10) Patent No.: US 11,038,399 B1
(45) Date of Patent: Jun. 15, 2021

(54) ELECTRIC MOTOR-GENERATOR AND METHOD OF OPERATING THE SAME

(71) Applicant: Christian H. F. Burke, Tehachapi, CA (US)

(72) Inventor: Christian H. F. Burke, Tehachapi, CA (US)

( * ) Notice: Subject to any disclaimer, the term of this patent is extended or adjusted under 35 U.S.C. 154(b) by 0 days.

(21) Appl. No.: 17/173,071

(22) Filed: Feb. 10, 2021

(51) Int. Cl.
*H02K 7/18* (2006.01)
*H02K 11/30* (2016.01)
*H02K 3/04* (2006.01)

(52) U.S. Cl.
CPC ............ *H02K 7/1807* (2013.01); *H02K 3/04* (2013.01); *H02K 11/30* (2016.01)

(58) Field of Classification Search
CPC ......... H02K 7/1807; H02K 11/30; H02K 3/04
USPC ....................................................... 310/68 R
See application file for complete search history.

(56) References Cited

U.S. PATENT DOCUMENTS

| | | | | |
|---|---|---|---|---|
| 5,204,570 A * | 4/1993 | Gerfast | ................ | H02K 1/2726 310/156.38 |
| 5,481,166 A * | 1/1996 | Moreira | .................... | H02P 6/18 318/400.04 |
| 6,545,444 B2 | 4/2003 | Bedini | | |
| 7,095,126 B2 | 8/2006 | McQueen | | |
| 8,008,826 B2 * | 8/2011 | Hull | ........................ | H02K 21/16 310/181 |
| 8,294,317 B2 * | 10/2012 | Kamida | ................. | A61B 5/389 310/156.01 |
| 8,816,557 B2 * | 8/2014 | Long | ...................... | H02J 7/0068 310/194 |
| 2010/0038986 A1 * | 2/2010 | Hull | ......................... | H02K 1/02 310/165 |
| 2010/0277023 A1 * | 11/2010 | Kamida | ................. | H02K 21/14 310/156.01 |
| 2011/0273052 A1 * | 11/2011 | Long | ...................... | H02K 16/02 310/208 |
| 2017/0346377 A1 * | 11/2017 | Deak, Sr. | ................. | H02K 1/34 |

* cited by examiner

*Primary Examiner* — John K Kim

(57) ABSTRACT

An electric motor-generator and method of use including a bowl-shaped coated copper windings electromagnet (50M), a bowl-shaped coated copper windings generator coil (50G), a spheroidal shaped super magnet and axle rotor unit (20) having one or a plurality of super magnets assembled together to form an approximately spheroidal shaped super magnet fixedly connected around an axle (30), and, an electric circuit (310) configured in such a way as to repetitively pulse and reverse direct current to the bowl-shaped coated copper windings electromagnet and connect to a power source. The bowl-shaped coated copper windings electromagnet is configured to repetitively repel the approximately spheroidal shaped super magnet when pulsed reversing direct current is applied, and the approximately spheroidal shaped super magnet is configured to rotate within the cavities of both the bowl-shaped coated copper windings electromagnet and the bowl-shaped coated copper windings generator coil, whereby alternating current is produced.

14 Claims, 15 Drawing Sheets

©2021 Christian Burke

©2021 Christian Burke

©2021 Christian Burke

©2021 Christian Burke

©2021 Christian Burke

©2021 Christian Burke

©2021 Christian Burke

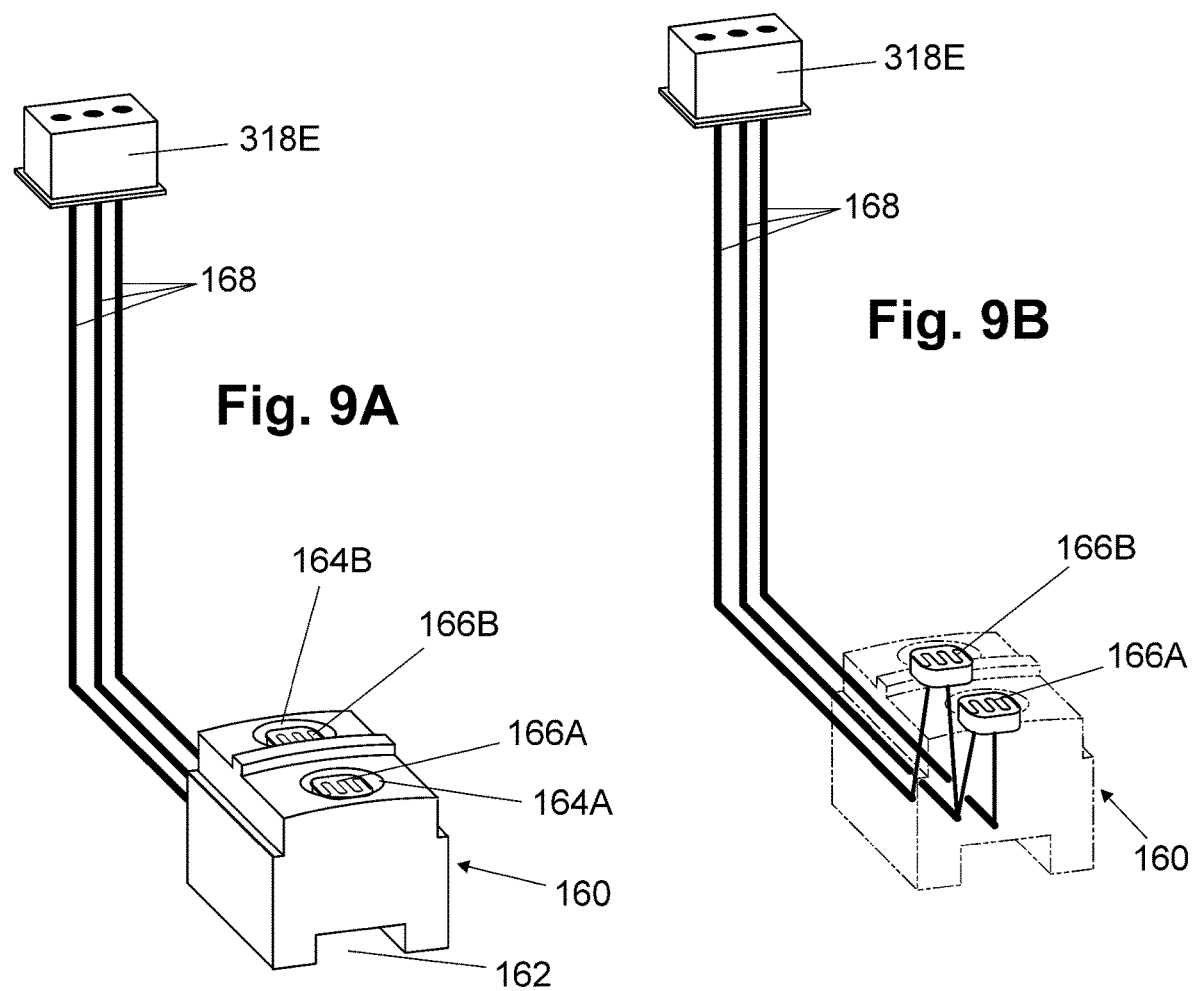

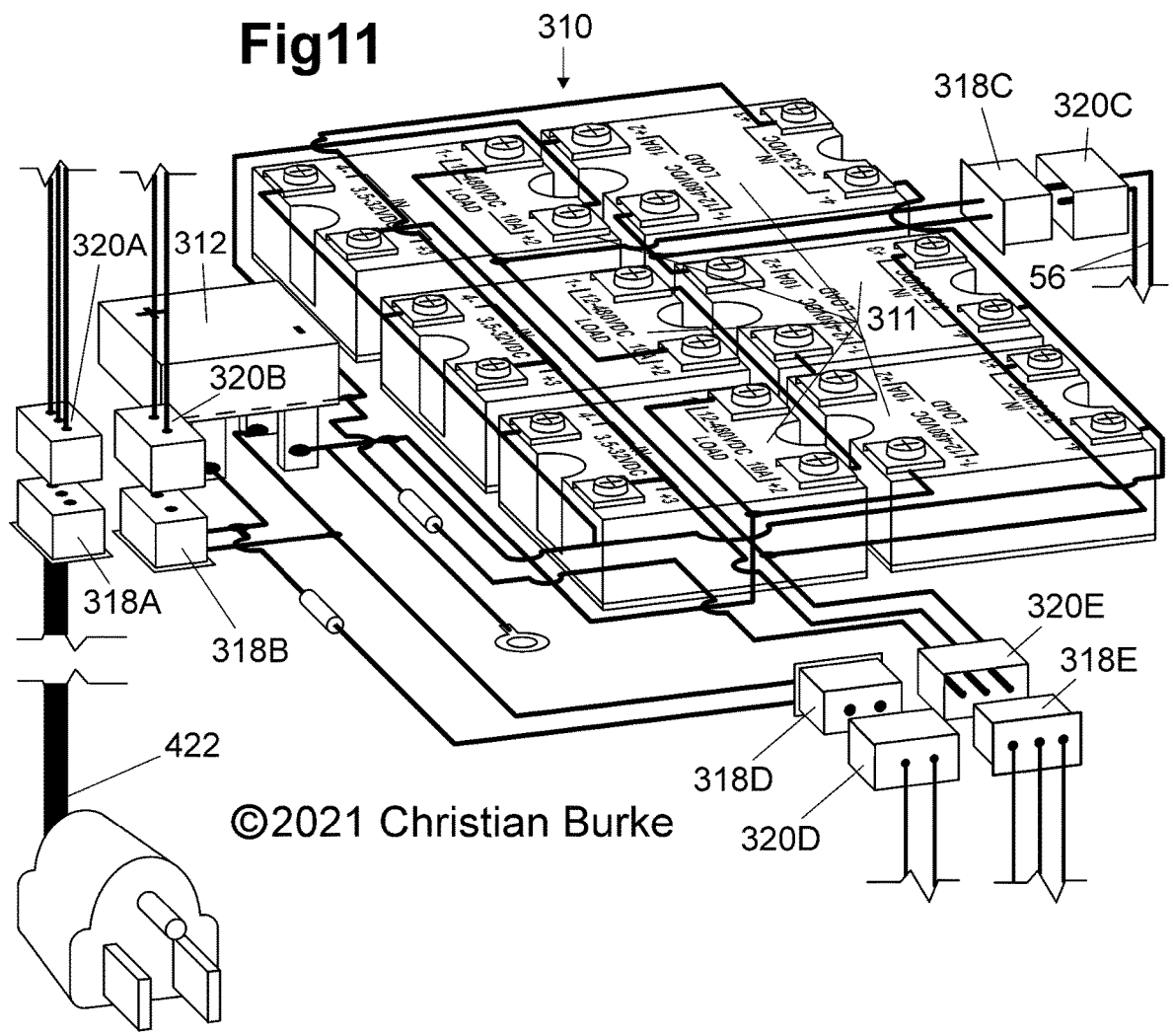

©2021 Christian Burke

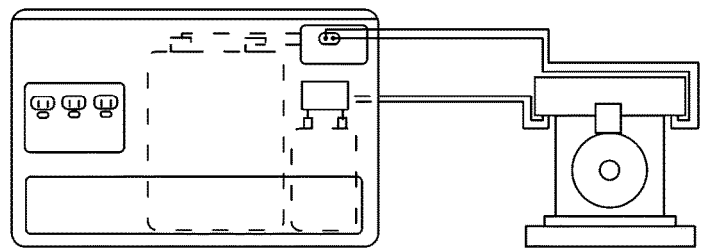
Fig. 15A
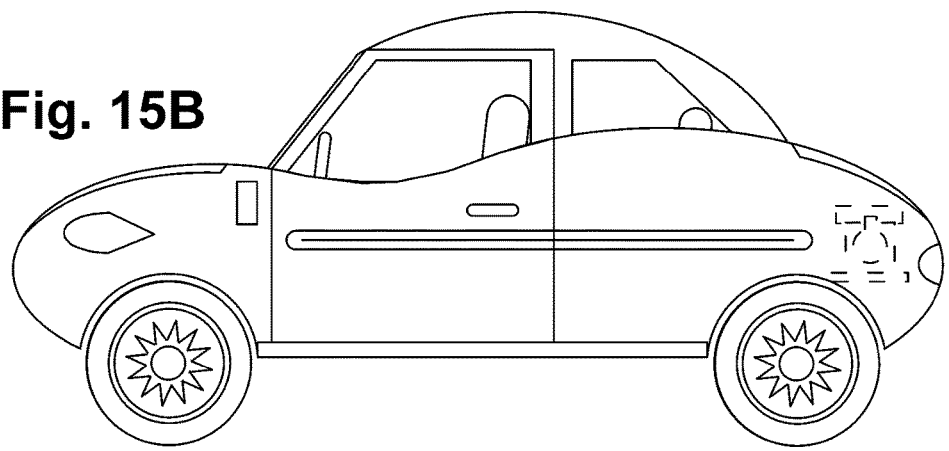
Fig. 15B
Fig. 15C
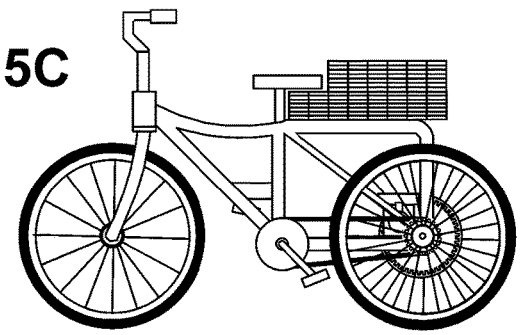
Fig. 15D
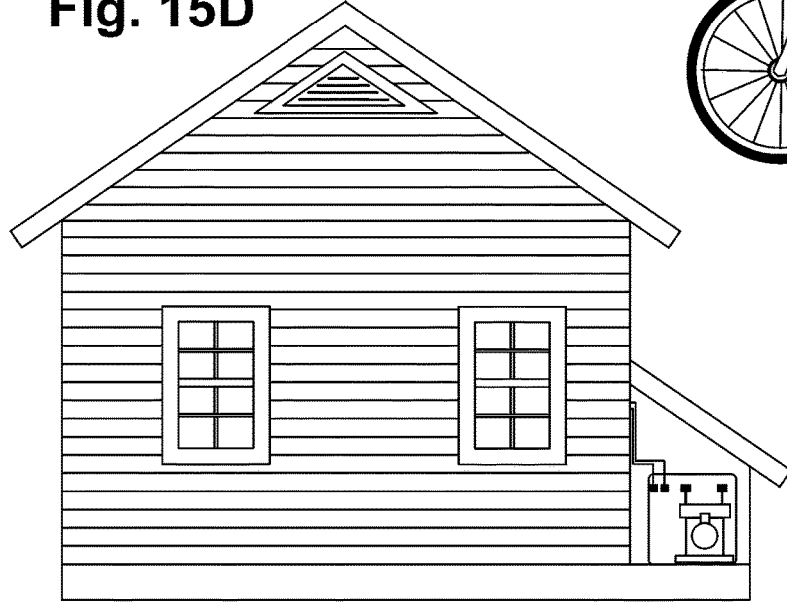
©2021 Christian Burke

ELECTRIC MOTOR-GENERATOR AND METHOD OF OPERATING THE SAME

CROSS REFERENCE TO RELATED APPLICATIONS

Not applicable.

FEDERALLY SPONSORED RESEARCH OR DEVELOPMENT

Not applicable.

SEQUENCE, TABLE, OR COMPUTER PROGRAM LISTING

Not applicable.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

For decades, nuclear, hydroelectric, and coal-burning power plants have provided the United States and the world with affordable electricity, but the environmental cost is high and sustainable production is questionable. Today, radioactive nuclear waste from nuclear power plants in the form of thousands of tons of spent fuel rods pile up in storage facilities. Hydroelectric dams adversely affect surrounding habitats, and suitable locations to build them are becoming scarce. Coal-burning power plants emit billions of tons of climate-changing carbon dioxide into the atmosphere as they deplete the world's coal reserves for future generations.

Wind and solar are alternative sources of electricity that deliver electricity to consumers, directly or through a power grid. These alternative sources are less cost-effective than power plants, have their own set of environmental challenges, and have unique limitations in that the wind doesn't always blow, and the sun doesn't always shine. Additionally, the need for electricity will increase to meet the demands of a growing world population.

A low-cost, sustainable, more environmentally friendly solution is needed to overcome these problems to better meet the growing demand for electricity to power homes, businesses, vehicles, and a multitude of other needs for generations to come.

SUMMARY

In one embodiment of the present disclosure, an electric motor-generator is provided, comprising a bowl-shaped coated copper windings electromagnet, a bowl-shaped coated copper windings generator coil, a spheroidal shaped super magnet and axle rotor unit comprising one or a plurality of super magnets assembled together to form an approximately spheroidal shaped super magnet fixedly connected around an axle, and, an electric circuit configured in such a way as to repetitively pulse and reverse direct current to the bowl-shaped coated copper windings electromagnet and connect to a power source, wherein the approximately spheroidal shaped super magnet of the spheroidal shaped super magnet and axle rotor unit resides within the cavities of both the bowl-shaped coated copper windings electromagnet and the bowl-shaped coated copper windings generator coil, wherein the bowl-shaped coated copper windings electromagnet is configured in such a way as to repetitively repel the approximately spheroidal shaped super magnet when pulsed reversing direct current is applied, and, wherein the approximately spheroidal shaped super magnet is configured in such a way as to rotate within the cavities of both the bowl-shaped coated copper windings electromagnet and the bowl-shaped coated copper windings generator coil, whereby alternating current is produced.

Also in one embodiment, the approximately spheroidal shaped super magnet may comprise one or a plurality of rare earth metal materials such as neodymium. Also in one embodiment, the axle of the spheroidal shaped super magnet and axle rotor unit may comprise a nonferrous metal material such aluminum or titanium. Also in one embodiment, a support base comprising a highly ferrous metal such as iron or steel may be fixedly attached to the axle and configured in such a way as to structurally support the super magnets of the spheroidal shaped super magnet and axle rotor unit. Also in one embodiment, a first and second interior support structure comprising a nonferrous material may be configured in such a way as to supportively contain the bowl-shaped coated copper windings electromagnet and the bowl-shaped coated copper windings generator coil, respectively.

Also in one embodiment, an exterior housing may be configured in such a way as to supportively contain the first and second interior support structures with the bowl-shaped coated copper windings electromagnet and the bowl-shaped coated copper windings generator coil, respectively, and house the spheroidal shaped super magnet and axle rotor unit. Also in one embodiment, a plurality of rotor bearings may be supportively held by the exterior housing and configured in such a way as to support the rotation of the axle of the spheroidal shaped super magnet and axle rotor unit. Also in one embodiment, the bowl-shaped coated copper windings electromagnet may be from about 300 to about 10,000 approximately horizontal windings of 18 to 24 AWG coated copper wire, the number of windings determined by a desired use. Also in one embodiment, the bowl-shaped coated copper windings generator coil may comprise one or a plurality of wires having from about 300 to about 10,000 horizontal windings of 18 to 24 AWG coated copper wire wound for one or a plurality of current outputs to support a desired voltage output. Also in one embodiment, the electric circuit may be connected to the power source, and voltage from the power source to the electric circuit may be stepped up to between about 120 volts to about 400 volts.

In another aspect of the present disclosure, a method for generating electrical current is provided, wherein the approximately spheroidal shaped super magnet resides and rotates within both cavities of the bowl-shaped coated copper windings electromagnet and the bowl-shaped coated copper windings generator coil, wherein the bowl-shaped coated copper windings electromagnet is configured to repetitively repel the approximately spheroidal shaped super magnet of the spheroidal shaped super magnet and axle rotor unit when repetitively pulsed and reversing direct current is applied, wherein the approximately spheroidal shaped super magnet of the spheroidal shaped super magnet and axle rotor unit comprises one or a plurality of rare earth metal materials such as neodymium and is configured to rotate within the cavity of the bowl-shaped coated copper windings generator coil, whereby alternating current is produced.

BRIEF DESCRIPTION OF DRAWINGS

In the drawings, closely related figures have the same number, but different alphabetic suffixes. By way of example, embodiments of the present disclosure are described below with reference to the accompanying drawings in which:

FIG. 6 shows an exploded, front right perspective view, according to one embodiment, of two halves of an exterior housing with a spheroidal shaped super magnet sphere and axle rotor unit positioned in between.

FIG. 9A shows an enlarged, front right perspective view of the LDR assembly unit, as shown in FIG. 8A, that contains two light dependent resistors.

FIG. 9B shows an enlarged, front right perspective view of the light dependent resistors of FIG. 9A showing a connection tor light dependent resistor (LDR) lead wires to a male plug.

FIG. 11 shows a front right perspective view, according to one embodiment, of a group of solid-state relays of an electric circuit.

FIG. 15A shows a right view of a backup battery generator attached to an embodiment of the present disclosure as an exemplary application.

FIG. 15B shows a right view of a car attached to an embodiment of the present disclosure as an exemplary application.

FIG. 15C shows a right view of a three-wheel bike attached to an embodiment of the present disclosure as an exemplary application.

FIG. 15D shows a right view of a house and its hardware attached to an embodiment of the present disclosure as an exemplary application.

DETAILED DESCRIPTION OF EMBODIMENTS

There are several advantages to one or more aspects of the present disclosure. One advantage is a high ratio of output to input current that is capable of producing more electricity than is used for operation, thereby providing a reliable source of electricity. Another advantage is providing a sustainable and more environmentally friendly solution with the use of an ample amount of copper wire, which can be readily recycled, and a smaller amount of super magnet. Yet another advantage is a small, compact design, which can be built using injection molded parts. These and other advantages of one or more aspects of the present disclosure will become apparent to one skilled in the art from a consideration of the description below and accompanying drawings.

The following detailed description and related drawings describe and illustrate exemplary embodiments of the present disclosure. The description and drawings serve to enable one skilled in the art to make and use an embodiment and are not intended to limit the scope of the present disclosure in any manner to the particular embodiments or method of operation described as those skilled in the art will recognize numerous other embodiments and methods of operation are within the scope of the present disclosure.

Unless otherwise specified herein, the use of the descriptors "top," "middle," "bottom," "center," "side," "up," "above," "below," and similar descriptors refer to the orientation of an embodiment in a figure and are not intended to describe any orientation of an embodiment. The term "super magnet" is used herein to describe a type of permanent magnet that typically includes or is formed of rare earth metals such as a neodymium alloy or other alloys incorporating rare earth metals that have strong magnetism and, are therefore highly responsive to a magnetic field. The term "coated copper windings" is used herein to describe windings or turns of coated copper wire, and the abbreviation AWG indicates American Wire Gauge, a standardized wire gauge system.

Throughout this specification, reference to "one embodiment," "an embodiment," "various embodiments," and similar descriptors means that a particular feature, structure, or characteristic described in connection with the embodiment is included in at least one embodiment. Thus, appearances of the phrases "according to one embodiment," "according to an embodiment," and similar phrases may refer to the same embodiment, but may not. Furthermore, the particular features, structures, or characteristics in one or more embodiments may be combined in any suitable manner, as would be apparent to one of ordinary skill in the art from the present disclosure.

Spheroidal Shaped Super Magnet and Axle Rotor Unit

Figure 1A:
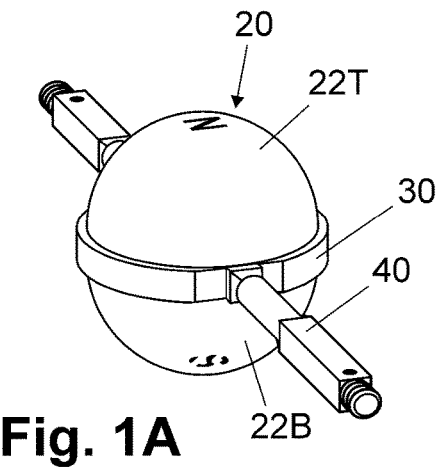
FIG. 1A shows a front right perspective view, according to an embodiment, of a spheroidal shaped super magnet sphere and axle rotor unit, assembled.

FIG. 1A shows a front right perspective view of an assembly, according to one embodiment, having an approximately spheroidal shaped super magnet and axle rotor unit 20. This unit may be made with a single spheroidal shaped super magnet having a center opening through which an axle 40 may be threaded. However, in this embodiment, the spheroidal shaped super magnet comprises a first and second super magnet half sphere 22T and 22B attached to a support base 30 to compensate for the brittle nature of super magnets such as high-powered neodymium. Alternatively, the spheroidal shaped super magnet may comprise a plurality of super magnets assembled to form the spheroidal shape of the rotor unit 20.

Figure 1B:
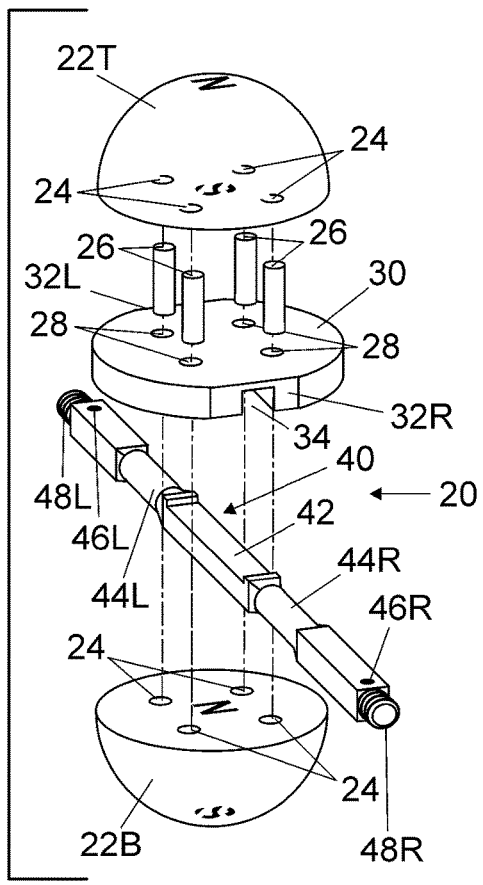
FIG. 1B shows an exploded, front right perspective view of the spheroidal shaped super magnet sphere and axle rotor unit of FIG. 1A, unassembled.
Figure 1C:
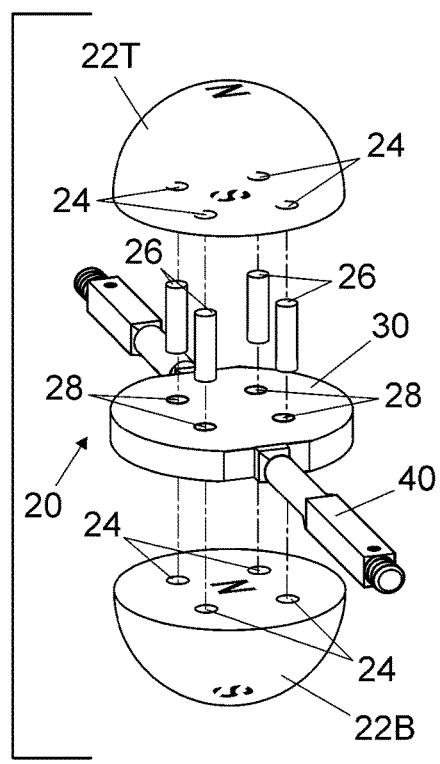
FIG. 1C shows an exploded, front right perspective view of the spheroidal shaped super magnet sphere and axle rotor unit of FIG. 1A, partially unassembled, with a support base set into place on an axle.

FIGS. 1B and 1C show exploded, front right perspective views of the spheroidal shaped super magnet and axle rotor unit 20 as shown in FIG. 1A, unassembled and partially assembled, respectively. The support base 30 may have a depth similar to the axle 40 and may consist of a highly ferrous metal such as iron or steel, although other highly ferrous metal materials are suitable. The support base 30 may also be magnetized. The opposing sides of support base 30 may have a slightly shaved portion 32L and 32R, respectively, and a centered, deep rectangular recessed channel 34 extending the length of one face of the support base 30 from shaved portion 32L to shaved portion 32R. The support base 30 may have one or a plurality of support base holes 28 throughout, each to fit a corresponding support base dowel 26. One skilled in the art will recognize that other suitable fastening devices may alternatively be used.

The axle 40 may comprise a nonferrous metal material such as titanium or aluminum. In this embodiment, the shape of axle 40 is square, but other shapes of nonferrous metal materials that are similarly strong may be suitable. A shallow recess 42 may be present in one of the four planes of the axle 40 near its center. The deep rectangular recessed channel 34 in the support base 30 may fit over the shallow recess 42 in such a way that both faces of the support base 30 are flush with the two opposite planes of the axle 40.

A face of the first super magnet half-sphere 22T may have a south-pole, and a face of the second super magnet half-sphere 22B may have a north-pole. The face of the first half-sphere 22T may attach to the top face of the support base 30 on the axle 40 by magnetic attraction and/or by a suitable adhesive such as glue. Support base dowels 26 may fit through corresponding support base holes 28 in the support base 30, each penetrating into a corresponding shallow hole 24 in the face of the first super magnet half sphere 22T.

Figure 4A:
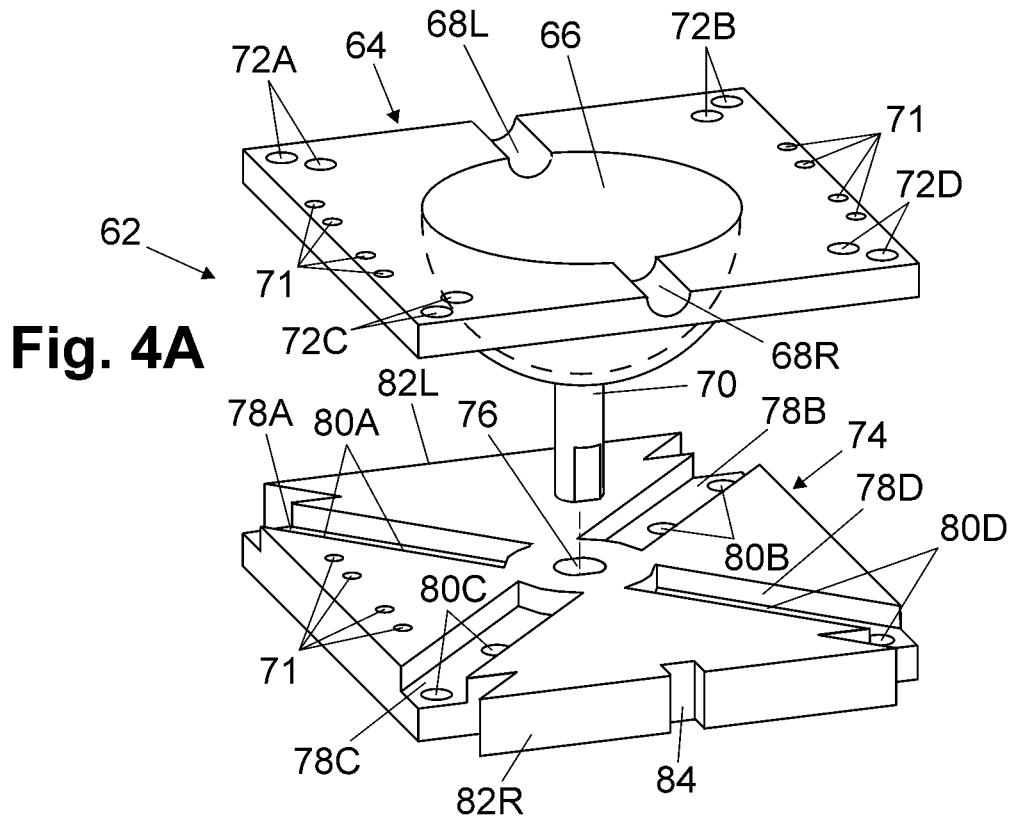
FIG. 4A shows an exploded, front right perspective view, according to one embodiment, of two sections of an interior support structure.
Figures 8A, 8B:
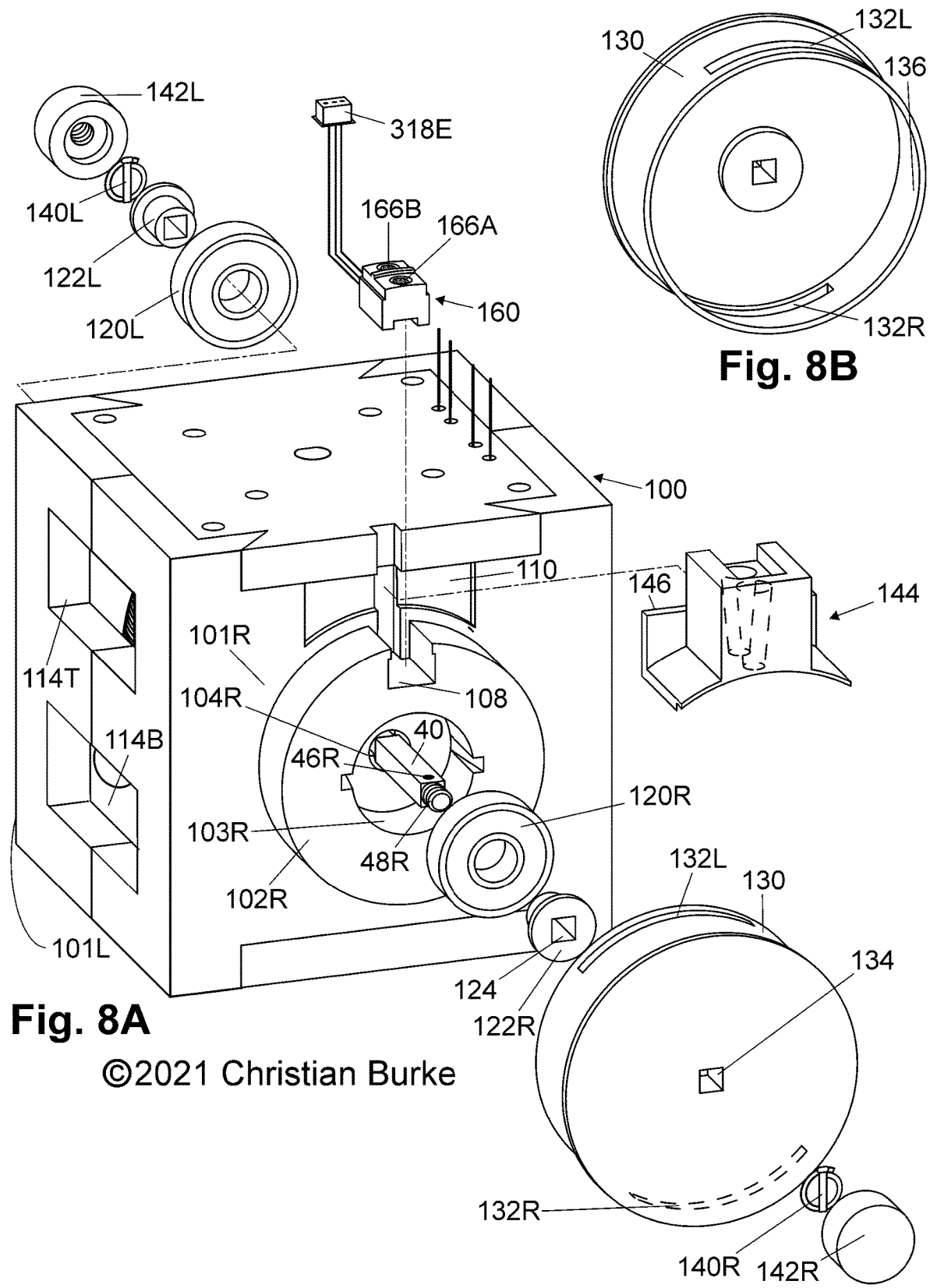
FIG. 8A shows a front right perspective view of FIG. 7, assembled, along with an exploded, front right perspective view of a light channel housing unit and a light dependent resistor (LDR) assembly unit configured to fixedly attached to a side face of the exterior housing. The exploded view also shows a timing wheel and a set of ring ball bearings, axle sleeves, lynch pins, and end caps.
FIG. 8B shows a front right perspective view of the opposite side of the timing wheel of FIG. 8A.

The face of the second super magnet half sphere 22B may be attached to the bottom face of the support base 30 by magnetic attraction and/or by a suitable adhesive such as glue. Support base dowels 26 may fit through corresponding support base holes 28 in the support base 30 and penetrate into corresponding shallow holes 24 in the face of the second super magnet half sphere 22B. A shaved axle portion 44L and 44R of the axle 40 may flank the spheroidal shaped super magnet to allow the axle 40 to fit within and rotate freely within a rounded recessed channel 68L and 68R as shown in FIG. 4A. Near each end of the axle 40 may be a lynch pin hole 46L and 46R, respectively, to accommodate a corresponding lynch pin 140L and 140R, as shown in FIG. 8A, or other suitable fastening device. Optionally, at each end of the axle 40 may be a thread 48L and 48R, respectively, to secure a corresponding end cap 142L and 142R as shown in FIG. 8A.

Electromagnet & Generator Coil

Figure 2:
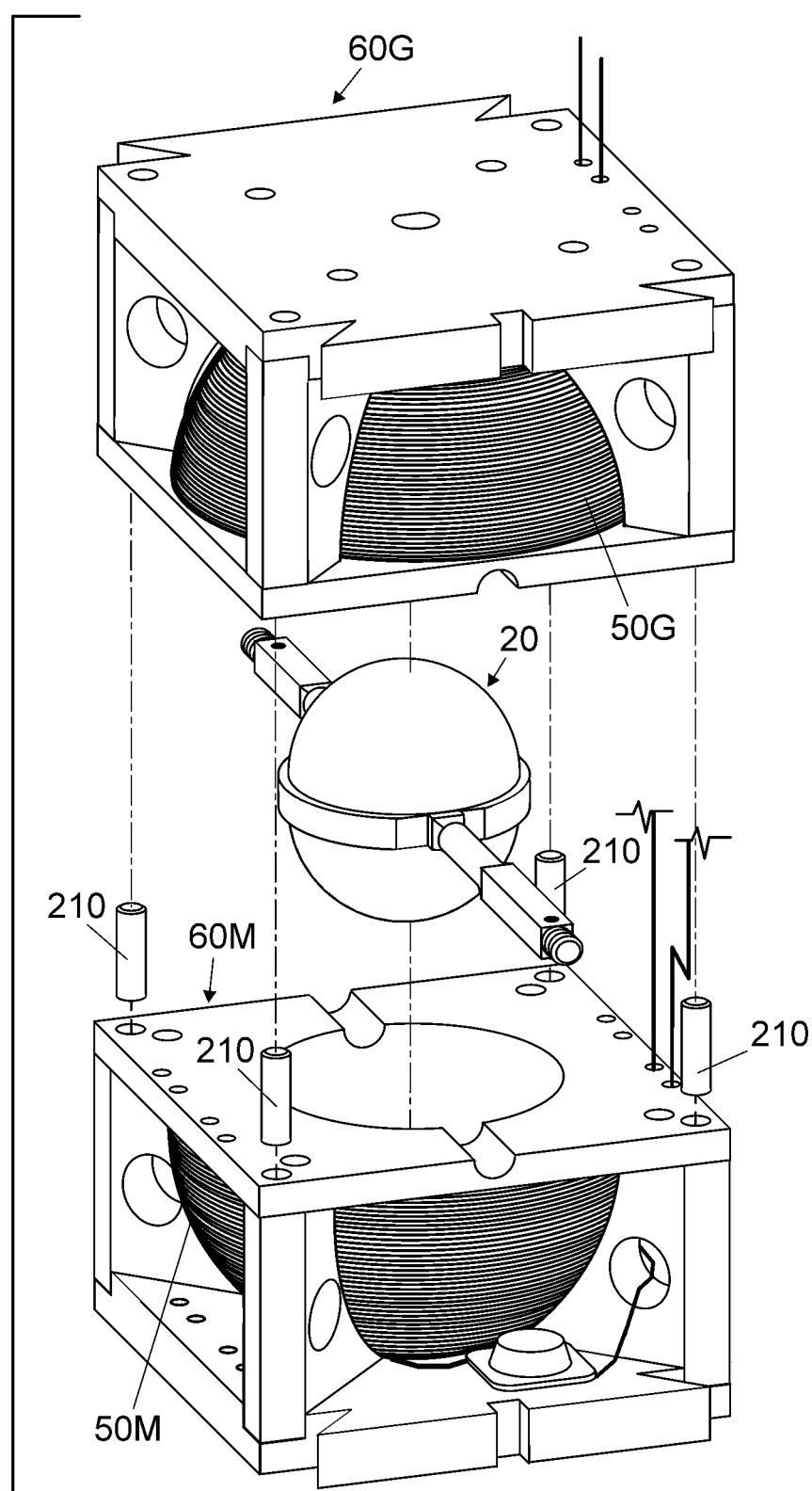
FIG. 2 shows an exploded, front right perspective view, according to an embodiment, of a bowl-shaped coated copper windings electromagnet supportively contained by a first interior support structure assembly unit. Above is a spheroidal shaped super magnet sphere and axle rotor unit. At the top is a bowl-shaped coated copper windings generator coil supportively contained by a second interior support structure assembly unit.

FIG. 2 shows an exploded, front right perspective view of a bowl-shaped coated copper windings generator coil 50G, the spheroidal shaped super magnet and axle rotor unit 20, and a bowl-shaped coated copper windings electromagnet 50M, according to an embodiment. The bowl-shaped coated copper windings generator coil 50G may be supportively contained by an interior support structure assembly unit 60G. In a similar manner, an interior support structure assembly unit 60M may supportively contain the bowl-shaped coated copper wire electromagnet 50M. The spheroidal shaped super magnet and axle rotor unit 20 may reside and rotate, without touching, within the cavities of the bowl-shaped coated copper windings electromagnet 50M and the bowl-shaped coated copper windings generator coil 50G and their respective interior support structure assembly units 60M and 60G in such a way as to be freely rotatable. One or a plurality of attachment dowels 210 may be used to securely join the interior support structure assembly units 60G and 60M together. Alternatively, one skilled in the art will recognize that the interior support structure assembly units 60G and 60M may be attached together by other suitable configurations and/or include the use of a suitable adhesive material such as glue.

Figure 3A:
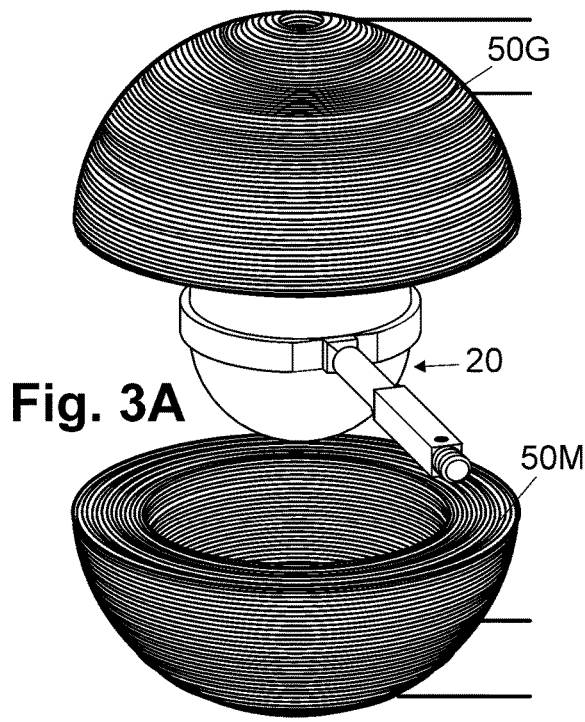
FIG. 3A shows an exploded, front right perspective view, according to an embodiment, of a bowl-shaped coated copper windings generator coil, a spheroidal shaped super magnet sphere and axle rotor unit, and a bowl-shaped coated copper windings electromagnet.

FIG. 3A shows an exploded, front right perspective view of a partial assembly of an embodiment. At the top is the bowl-shaped coated copper windings generator coil 50G having a plurality of coated copper windings. The bowl-shaped coated copper windings electromagnet 50M, also having a plurality of coated copper windings, is at the bottom. In the middle is the spheroidal shaped super magnet and axle rotor unit 20.

Figure 3B:
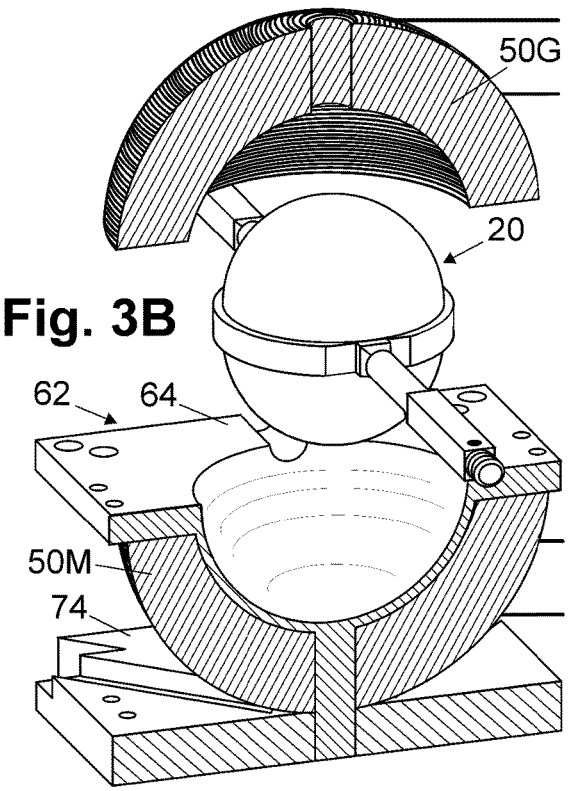
FIG. 3B shows an exploded, front right perspective view, according to one embodiment, of a cross section of a bowl-shaped coated copper windings generator coil, a cross section of a bowl-shaped coated copper windings electromagnet supportively contained in an interior support structure, and a spheroidal shaped super magnet sphere and axle rotor unit in the middle.

FIG. 3B shows an exploded, front right perspective view of a partial assembly of an embodiment. At the top is a cross section of the bowl-shaped coated copper windings generator coil 50G that has a plurality of coated copper windings. The spheroidal shaped super magnet sphere and axle rotor unit 20 is in the middle. A cross-section of a portion of a first interior support structure 62, having a top section 64 and a bottom section 74, supportively contains the bowl-shaped coated copper windings electromagnet 50M that has a plurality of coated copper windings.

Figure 3C:
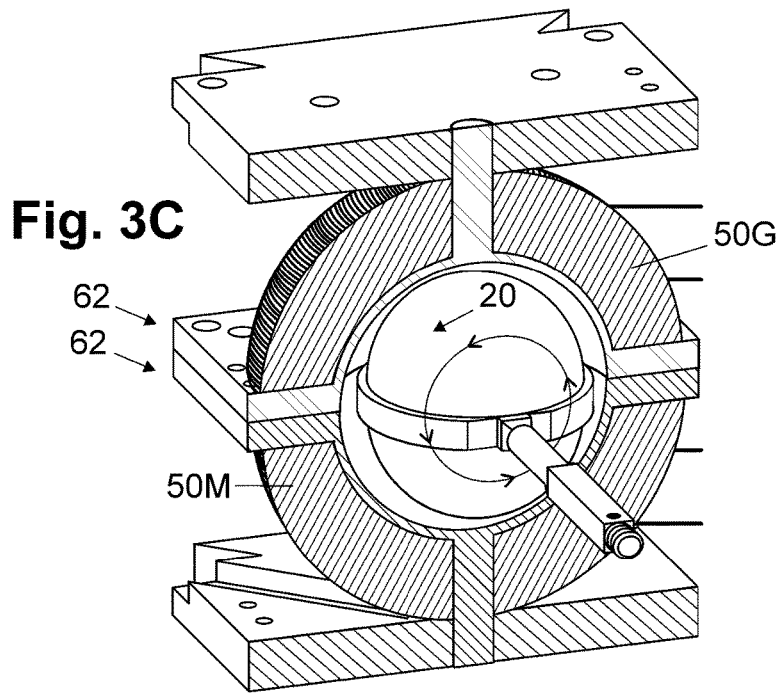
FIG. 3C shows a front right perspective view, according to an embodiment, of a cross section of a bowl-shaped coated copper windings electromagnet supportively contained by a first interior support structure, a spheroidal shaped super magnet sphere and axle rotor unit, and a cross section of a bowl-shaped coated copper windings generator coil supportively contained by a second interior support structure, assembled.

FIG. 3C shows a front right perspective cross section view of a partial assembly of an embodiment, assembled. The first interior support structure 62 may supportively contain the bowl-shaped coated copper windings electromagnet 50M and fixedly connect to a second interior support structures 62 containing the bowl-shaped coated copper windings generator coil 50G, within which the spheroidal shaped super magnet and axle rotor unit 20 is configured to freely rotate.

FIG. 4A shows an exploded, front right perspective view of the first interior support structure 62, as shown in FIG. 3B and FIG. 3C, according to one embodiment. The top section 64 of the first interior support structure 62 may be configured with a recessed bowl 66 that may be flanked by the two rounded recessed channels 68L and 68R, each diametrically opposed and extending from an edge of the recessed bowl 66 to an outer edge of the top section 64. A stem 70 may extend down from the recessed bowl 66 for insertion into an interior support structure center hole 76 in the bottom section 74 of the first interior support structure 62 to fixedly connect the two sections 64 and 74 together. One or a plurality of wire-threading through holes 71 may be present to accommodate future threading of wire. One or a plurality of corner through holes 72A-D may be used to accommodate attachment, dowels 210, as shown in FIG. 2, that provide structural support.

Figure 5A:
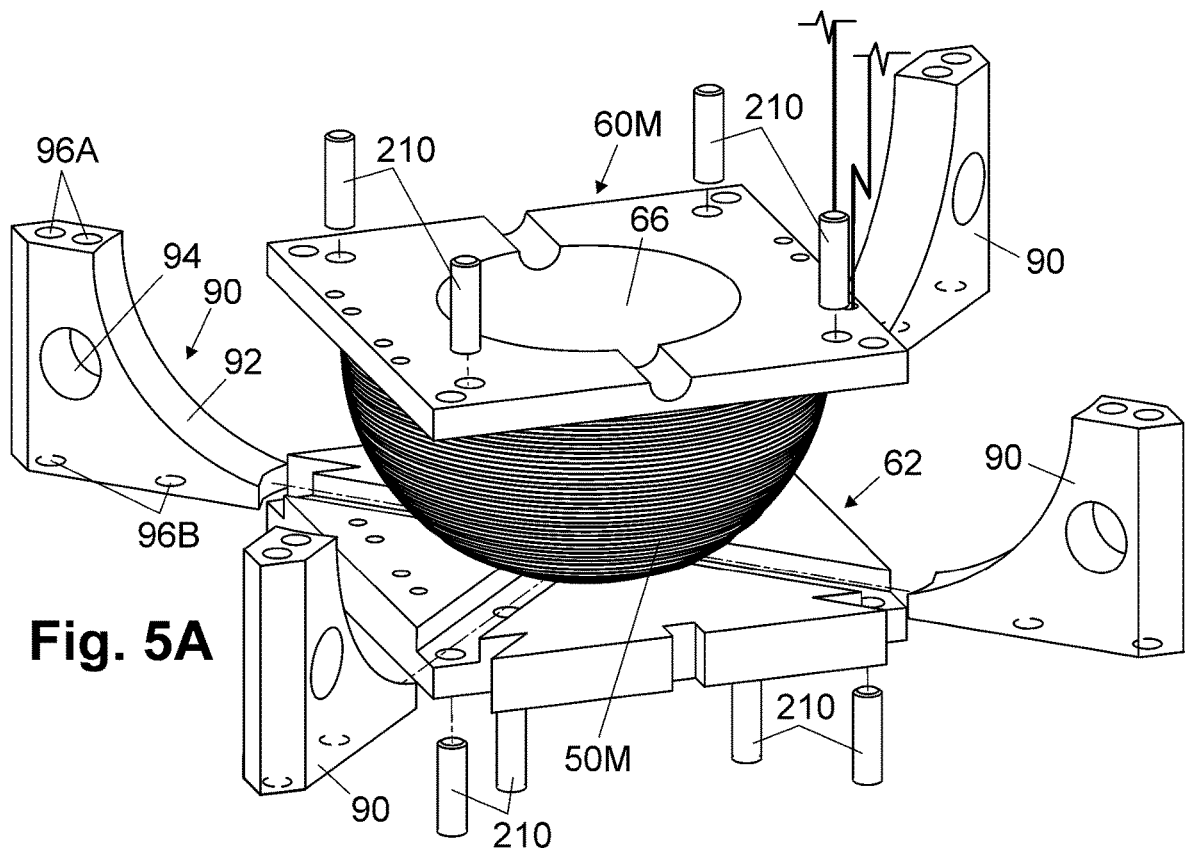
FIG. 5A shows an exploded, front right perspective view, according to one embodiment, of a bowl-shaped coated copper windings electromagnet supportively contained within a top and bottom section of an interior support structure, assembled, and an exploded view of corner supports.
Figure 7:
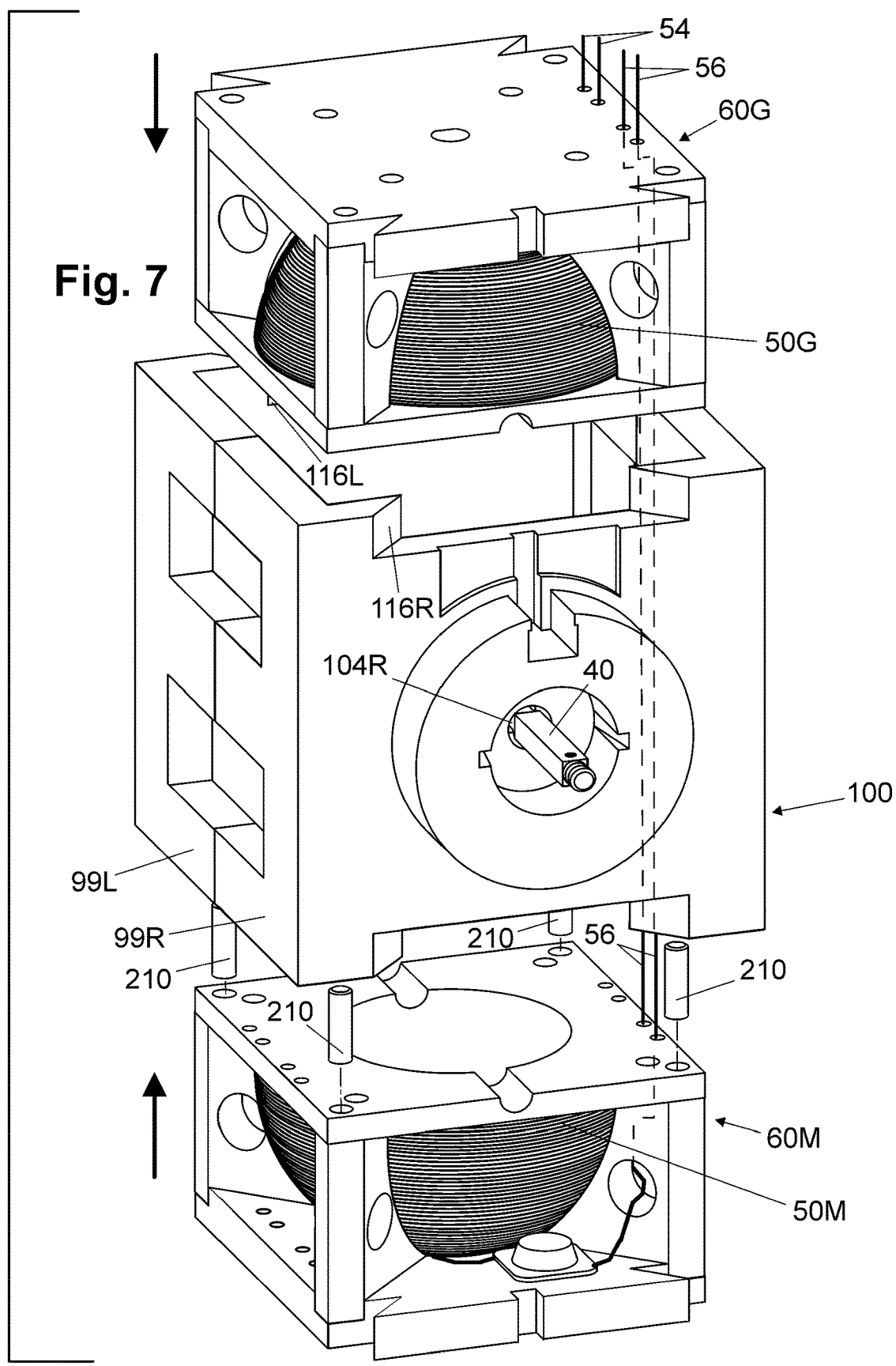
FIG. 7 shows an exploded, front right perspective view of a partial assembly of an embodiment. At, the bottom is a first interior support structure assembly unit with a bowl-shaped coated copper windings electromagnet supportively contained within. In the middle is an exterior housing with a spheroidal shaped super magnet sphere and axle rotor inside with an end of an axle extending through an exterior housing center hole. At the top is a second interior support structure assembly unit with a bowl-shaped coated copper windings generator coil supportively contained within.

A plurality of diagonal recessed channels 78A-D may extend horizontally inward from each corner of the bottom section 74 of the first interior support structure 62 and may have a plurality of corresponding corner holes 80A-D to structurally secure a plurality of corresponding corner supports 90 as shown in FIG. 5A. A dovetail 82R and 82L, each on opposing sides of the bottom section 74 of the first interior support structure 62, may fit into a respective mortise 116R and 116L on an exterior housing 100 as shown in FIG. 7. Wire-threading through holes 71 in the bottom section 74 of the first interior support structure 62 may be present to accommodate treading of wire. A shallow recessed channel 84 in the dovetail 82R may accommodate wire threaded from a light dependent resistor (LDR) assembly unit 160 as shown in FIG. 8A.

Figure 4B:
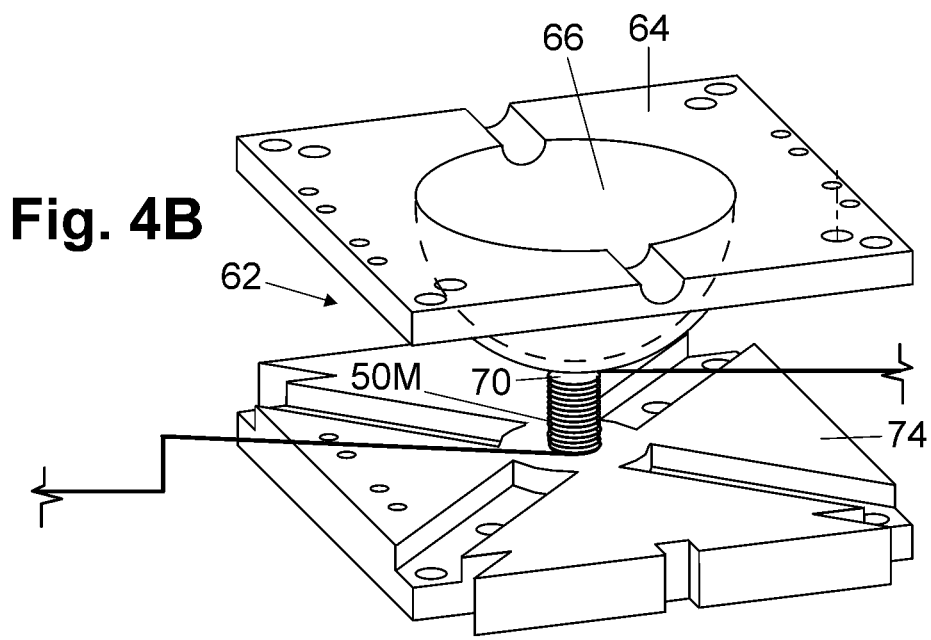
FIG. 4B shows a front right perspective view of two sections of the interior support structure of FIG. 4A, assembled, with the beginnings of a bowl-shaped coated copper windings electromagnet.

FIG. 4B shows a front right perspective view of the first interior support structure 62 of FIG. 4A, assembled, having the top section 64 and the bottom section 74 fixedly connected to create the first interior support structure 62. The stem 70 may be configured to support the beginnings of the bowl-shaped coated copper windings electromagnet 50M. A similar configuration with the second interior support structure 62 may be used to support the bowl-shaped coated copper windings generator coil 50G as shown in FIG. 2.

FIG. 5A shows an exploded, front right perspective view, according to one embodiment, of the bowl-shaped coated copper windings electromagnet 50M wound around the recessed bowl 66 and stem 70, as shown in FIG. 4B, of the first interior support structure 62 with corner supports 90. A curved side 92 of the corner support 90 may be configured in such a way as to support the bowl-shaped coated copper windings electromagnet 50M. A similar configuration may be used to support the bowl-shaped coated copper windings generator coil 50G. A corner support ventilation through hole 94 in the center of each corner support 90 may be used to circulate air. A plurality of corner support recessed holes 96A and 96B may be located at the top and bottom of each corner support 90, respectively, to accommodate the insertion of corresponding attachment dowels 210.

Figure 5B:
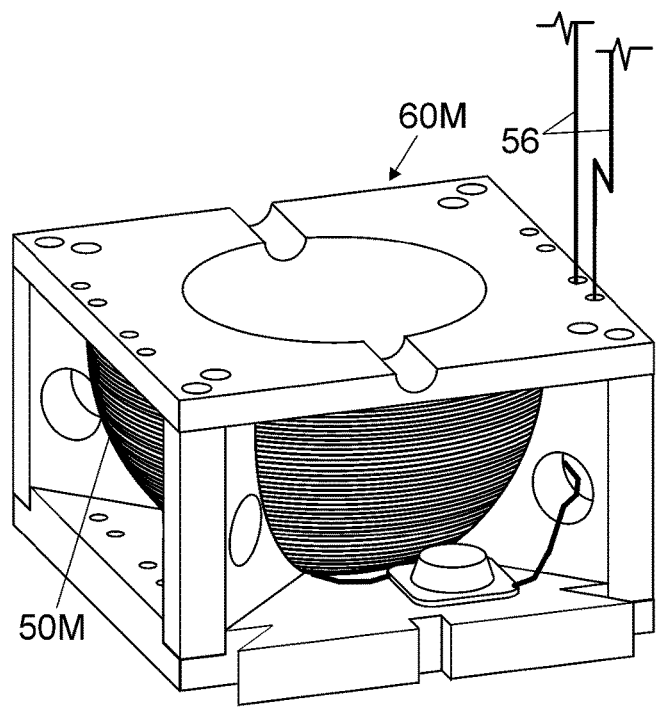
FIG. 5B shows a front right perspective view of FIG. 5A, assembled, with the bowl shaped coated copper windings electromagnet supportively contained within an interior support structure assembly unit.

FIG. 5B shows a front right perspective view of the embodiment shown in FIG. 5A, assembled. This configuration may be suitable for the interior support structure assembly unit 60M that supportively contains the bowl-shaped coated copper windings electromagnet 50M from which two electromagnet lead wires 56 may extend. This configuration may also be suitable for the interior support structure assembly unit 60G that supportively contains the bowl-shaped coated copper windings generator coil 50G as shown in FIG. 7.

Figure 6:
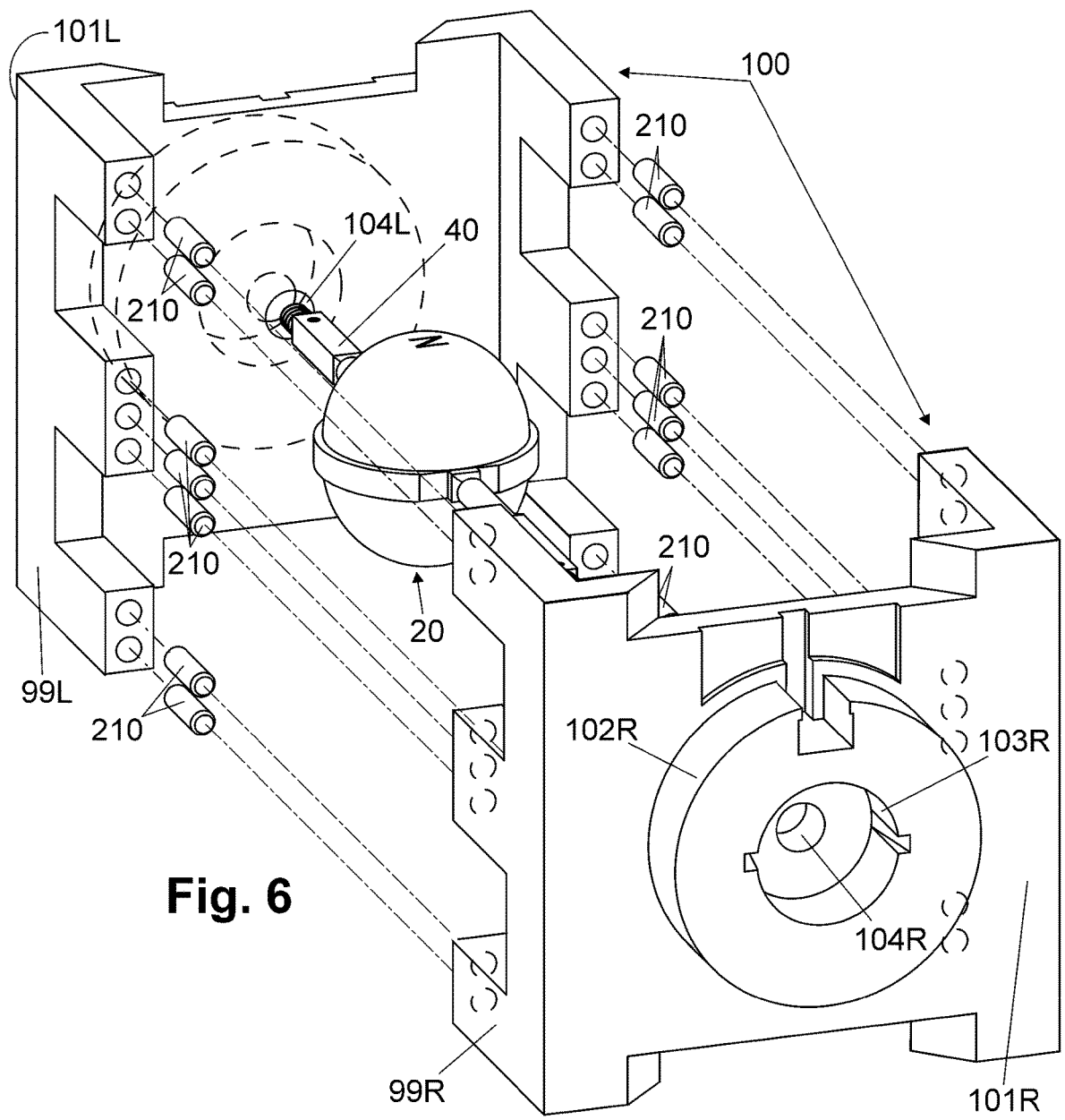

FIG. 6 shows an exploded, front right perspective view of the exterior housing 100, according to one embodiment. The exterior housing 100 may comprise a strong, heat-resistant nonferrous material such as injection molded nylon. In this embodiment a first exterior housing half 99L fixedly connects to a second exterior housing half 99R of similar shape to create the exterior housing 100. Alternatively, the exterior housing 100 may be manufactured from one piece of a heat-resistant nonferrous material or from multiple pieces with similar or different shapes that may be fixedly connected.

An exterior housing face 1018 of the second exterior housing half 99R may have a centered circular protrusion 102R surrounding a centered circular recess 103R and an exterior housing center hole 104R. The exterior housing center hole 104R may be sufficiently sized to allow the axle 40 of the spheroidal shaped super magnet and, axle rotor unit 20 to fit through and rotate freely. A similar configuration may be on an exterior housing face 101L on the first exterior housing half 99L. The two exterior housing halves 99L and 99R may be fixedly connected around the spheroidal shaped super magnet and axle rotor unit 20 with attachment dowels 210 and/or a suitable adhesive such as glue. Alternatively, one skilled in the art will recognize that other types of fastening devices may be used. One end of the axle 40 may extend through an exterior housing center hole 104L in the face of the first exterior housing half 99L; the other end of the axle 40 may extend through the exterior housing center hole 104R in the exterior housing face 1018 of the second exterior housing half 99R.

FIG. 7 shows an exploded, front right perspective view of the interior support structure assembly units 60G and 60M, according to one embodiment. The interior support structure assembly unit 60G may supportively contain the bowl-shaped coated copper windings generator coil 50G. The interior support structure assembly unit 60M may supportively contain the bowl-shaped coated copper windings electromagnet 50M. The two halves of the exterior housing 99L and 99R may be fixedly connected to make the exterior housing 100. One end of the axle 40 of the spheroidal shaped super magnet and axle rotor unit 20, as shown in FIG. 1A, may extend beyond one side of the exterior housing 100 through the exterior housing center hole 104R. A similar configuration may be present on an opposing side of the exterior housing 100. In this way, the two ends of the axle 40 of the spheroidal shaped super magnet and axle rotor unit 20 may extend through opposing sides of the exterior housing 100.

Figure 13A:
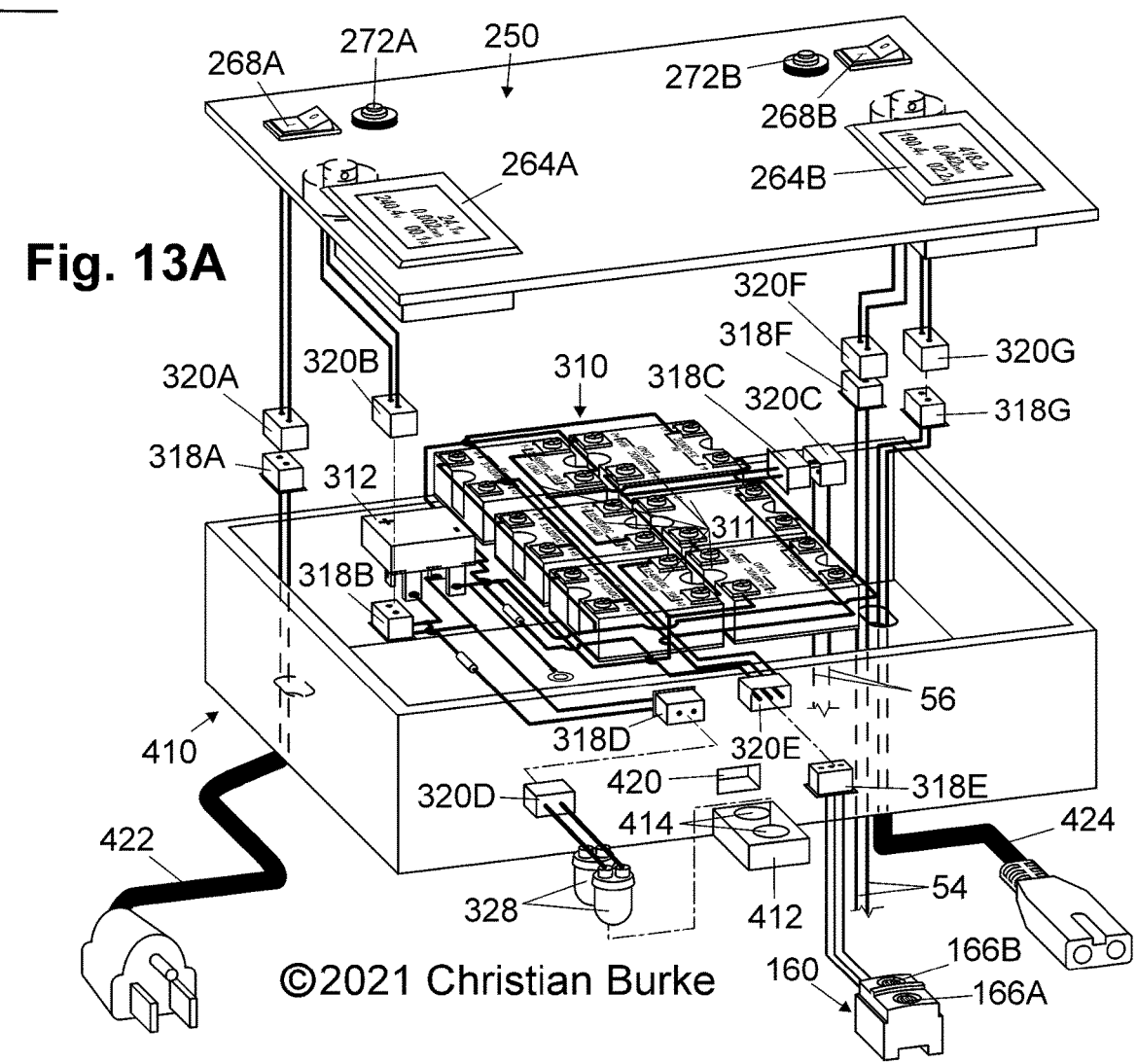
FIG. 13A shows an exploded, front right perspective view, according to an embodiment, of a lid and a circuit box with a group of solid-state relays, power cords, LED lights, and an LDR assembly unit.
Figure 14:
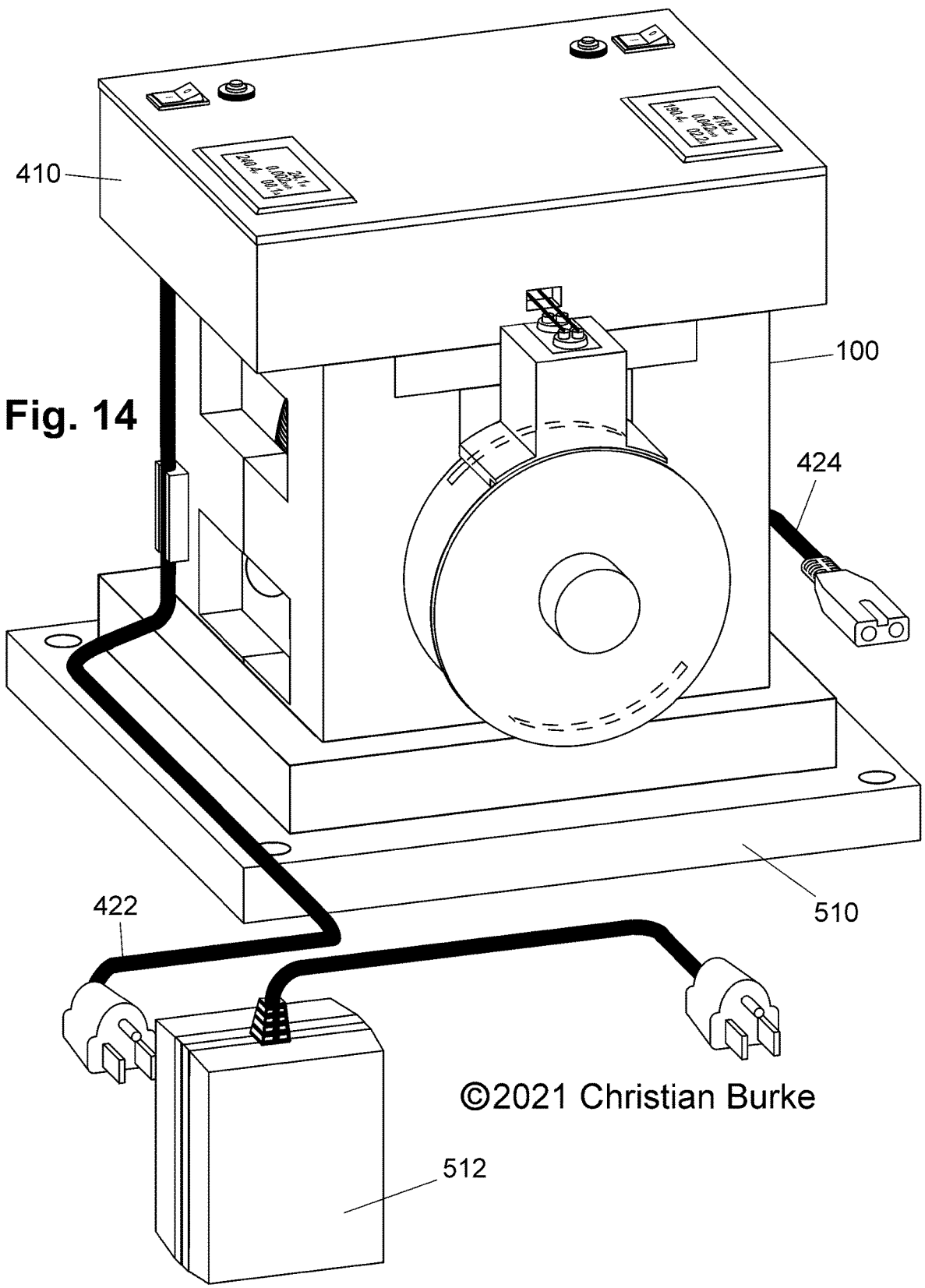
FIG. 14 shows a front right perspective view of an embodiment, assembled, with a circuit box on top, a mounting unit at the bottom, an input and output power cord, and an optional step-up transformer that plugs into a power source.

Further describing FIG. 7, lead wires 56 from the bowl-shaped coated copper windings electromagnet 50M may be passed up through the interior support structure assembly unit 60M, through the exterior housing 100, and through and out of the interior support, structure assembly unit 60G to be connected in a circuit box 410 as shown in FIG. 13A and FIG. 14. The interior support structure assembly unit 60M that supportively contains the bowl-shaped coated copper windings electromagnet 50M may be configured to push up into the exterior housing 100. Next, a plurality of generator coil lead wires 54 from the bowl-shaped coated copper windings generator coil 50G, which is supportively contained by interior support structure assembly unit 60G, may be threaded up through interior support structure assembly unit 60G and configured to connect in the circuit box 410 as shown in FIGS. 13A and 14. The interior support structure assembly unit 60G may be configured to push down into the exterior housing 100 and fixedly connect via the mortises 116L and 116R. Attachment dowels 210 or another suitable fastener and/or a suitable adhesive such as glue may be used to connect the interior support structure assembly units 60G and 60M together, leaving sufficient space for the spheroidal shaped super magnet and axle rotor unit 20 to rotate freely as shown in FIG. 3C.

FIG. 8A shows a front right perspective view of the embodiment shown in FIG. 7, assembled, along with an exploded view of additional parts that may be added to the assembly. The exterior housing face 101R of the exterior housing 100 may have the centered circular protrusion 102R with the center circular recess 103R and the exterior housing center hole 104R. A similar configuration may be on the opposing exterior housing face 101L of the exterior housing 100. In this way, the two ends of the axle 40 of the spheroidal shaped super magnet and axle rotor unit 20, as shown in FIG. 1A, may extend through opposing sides of the exterior housing 100. For assembly, a ring ball bearing 120R may be snuggly fitted into the centered circular recess 103R. An axle sleeve 122R having an axle sleeve through hole 124 may be slid onto the axle 40 and into the inner ring of the ring ball bearing 120R. Next, a timing wheel 130 having a timing wheel through hole 134 and a timing wheel cutout 132L and 132R may be slid onto the axle 40. In this embodiment, the axle sleeve through hole 124 and the timing wheel through hole 134 are square. Alternatively, shapes other than square may be used to fit a corresponding shape of the axle 40.

Further describing FIG. 8A, the lynch pin 140R may then be inserted into the lynch pin hole 46R in a section of the axle 40 that extends beyond the timing wheel 130. The end cap 142R may be screwed onto the tread 48R at one end of the axle 40. A similar assembly sequence may be performed on the other end of axle 40 using a ring ball bearing 120L, an axle sleeve 122L, the lynch pin 140L, and the end cap 142L. A center recess 108 in the top of the centered circular protrusion 102R may be present to allow for insertion of the LDR assembly unit 160 having a light dependent resistor (LDR) 166A and 166B connected to a male plug 318E. Next, a back side 146 of a light channel housing unit 144 may be inserted into an exterior housing recess 110 on the exterior housing face 101R of the exterior housing 100. A ventilation opening 114T and 114B in the exterior housing 100 may be present to dissipate heat.

FIG. 8B depicts a front right perspective view of the opposite side of the timing wheel 130 shown in FIG. 8A that may have a thin outside perimeter wall 136 with the timing wheel cutout 132L and 132R. Light may shine through the light channel housing unit 144, as shown in FIG. 8A, and down through the timing wheel cutouts 132L and 132R as the timing wheel 130 rotates, thereby allowing light to shine through to the LDR assembly unit 160, as shown in FIG. 8A, which in turn allows current to pass through the LDRs 166A and 166B to trigger a group of solid-state relays 311, as shown in FIG. 11, to pulse reversing direct current to the bowl-shaped coated copper windings electromagnet 50M as shown in FIG. 7.

FIG. 9A is an enlarged, front right perspective view of the LDR assembly unit 160, according to the embodiment shown in FIG. 8A. A light dependent resistor (LDR) recess 164A and 164B may be present to accommodate insertion of the LDRs 166A and 166B, respectively, into the LDR assembly unit 160. A light dependent resistor (LDR) assembly unit channel 162 may be present at the bottom of the LDR assembly unit 160 to allow sufficient space to connect one or a plurality of light depended resistor (LDR) wires 168 from the LDRs 166A and 166B to male plug 318E that, in turn, connects to a female plug 320E in the circuit box 410 as shown in FIG. 13A.

FIG. 9B is an, enlarged, front right perspective view of the embodiment shown in FIG. 9A that reveals the attachment of the LDR wires 168 to the LDRs 166A and 166B. LDR wires 168 may then connect to plug 318E that connects to plug 320E in the circuit box 410 as shown in FIG. 13A.

Figure 10A:
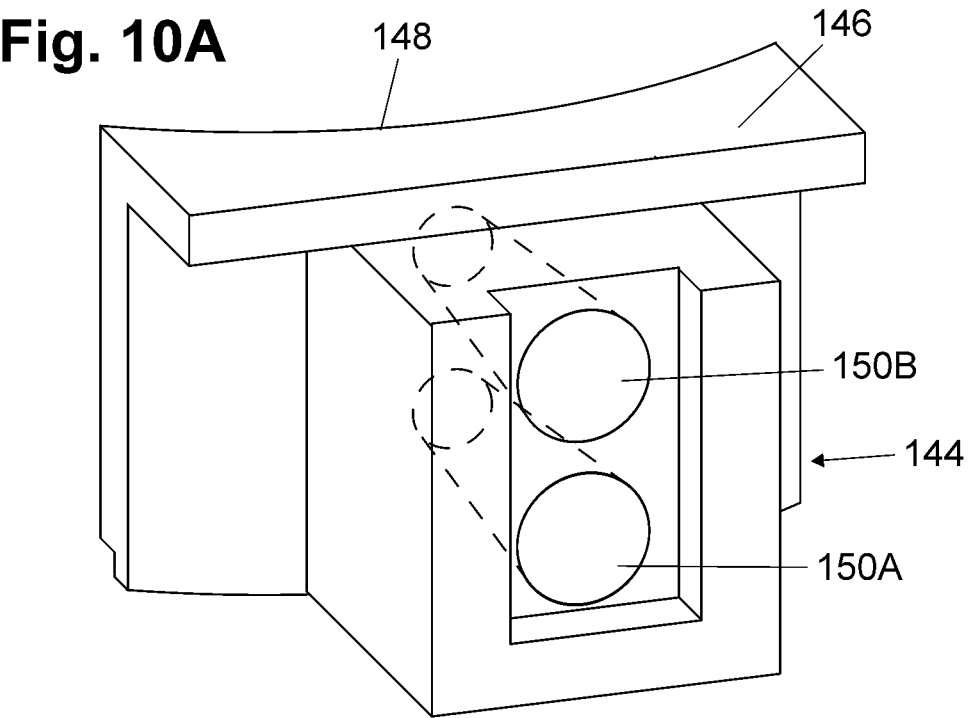
FIG. 10A shows an enlarged, top perspective view of the light channel housing unit with tapered through holes as shown in FIG. 8A.
Figure 10B:
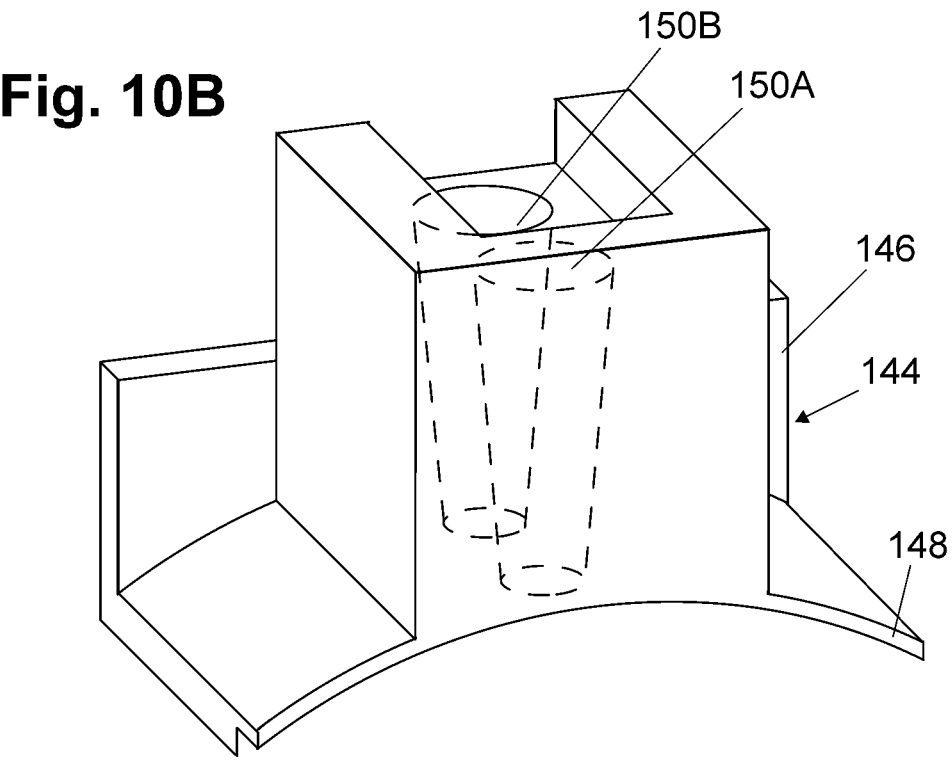
FIG. 10B shows an enlarged, front right perspective view of FIG. 10A.

FIGS. 10A and 10B show enlarged, top and front right perspective views, respectively, of the light channel housing unit 144 shown in FIG. 8A, according to one embodiment. A tapered through hole 150A and 150B may be present to funnel light down through the timing wheel cutouts 132L and 132R, respectively, as shown in FIG. 8A. The back side 146 of light channel housing unit 144 may be attached to the exterior housing recess 110 as shown in FIG. 8A. A flap 148 of the light channel housing unit 144 may be configured in such a way as to block unwanted external light.

The Electric Circuit

FIG. 11 shows a front right perspective view of an electric circuit 310, according to one embodiment. The purpose of the electric circuit 310 is to pulse and reverse direct current back and forth through the bowl-shaped coated copper windings electromagnet 50M as shown in FIG. 2. To do this, one or a plurality of LED lights 328, as shown in FIG. 13A, may shine light through cutouts 132L and 132R in the timing wheel 130 onto the LDRs 166B and 166A, respectively, in the LDR assembly unit 160 as shown in FIG. 8A. When light shines through the timing wheel cutout 132L onto LDR 166B, as shown in FIG. 8A, a current from about 3 volts to about 32 volts may pass through to a first half of the group of solid-state relays 311 to trigger current to pass through to the bowl-shaped coated copper windings electromagnet 50M as shown in FIG. 2. When light shines through the timing wheel cutout 132R and onto LDR 166A, as shown in FIG. 8A, a current from about 3 volts to about 32 volts may pass through to a second half of the group of solid-state relays 311 to trigger the current to reverse as it passes on to the bowl-shaped coated copper windings electromagnet 50M as shown in FIG. 2. In this way, reversing the direction of direct current to the bowl-shaped coated copper windings electromagnet 50M repetitively changes the polarity of the inside bottom of the bowl-shaped coated copper windings electromagnet 50M as shown in FIG. 2.

To further describe FIG. 11, an input power cord 422 may be attached to a male plug 318A that, in turn, connects to a female plug 320A, which feeds alternating or direct current through a switch 268A, a popup breaker 272A, and a meter reader 264A in a top lid 250 as shown in FIG. 13A. From the meter reader 264A, current may pass to a female plug 320B that, in turn, passes current to a male plug 318B and through a bridge rectifier 312, and ultimately to the group of solid-state relays 311 that pulses and reverses current out to a male plug 318C. Plug 318C connects to a female plug 320C that feeds current via lead wires 56 to the bowl-shaped coated copper windings electromagnet 50M as shown in FIG. 5B and FIG. 7.

Next, current from about 1 volt to about 10 volts may be fed to a male plug 318D, which connects to a female plug 320D that, in turn, may feed LED lights 328 as shown in FIG. 13A. A current from about 3 volts to about 32 volts may then be fed to plug 320E that connects to plug 318E, which connects to the LDR assembly unit 160 as shown in FIG. 13A. While this embodiment shows one configuration of the electric circuit 310, other configurations would be apparent to those skilled in the art.

Figure 12A:
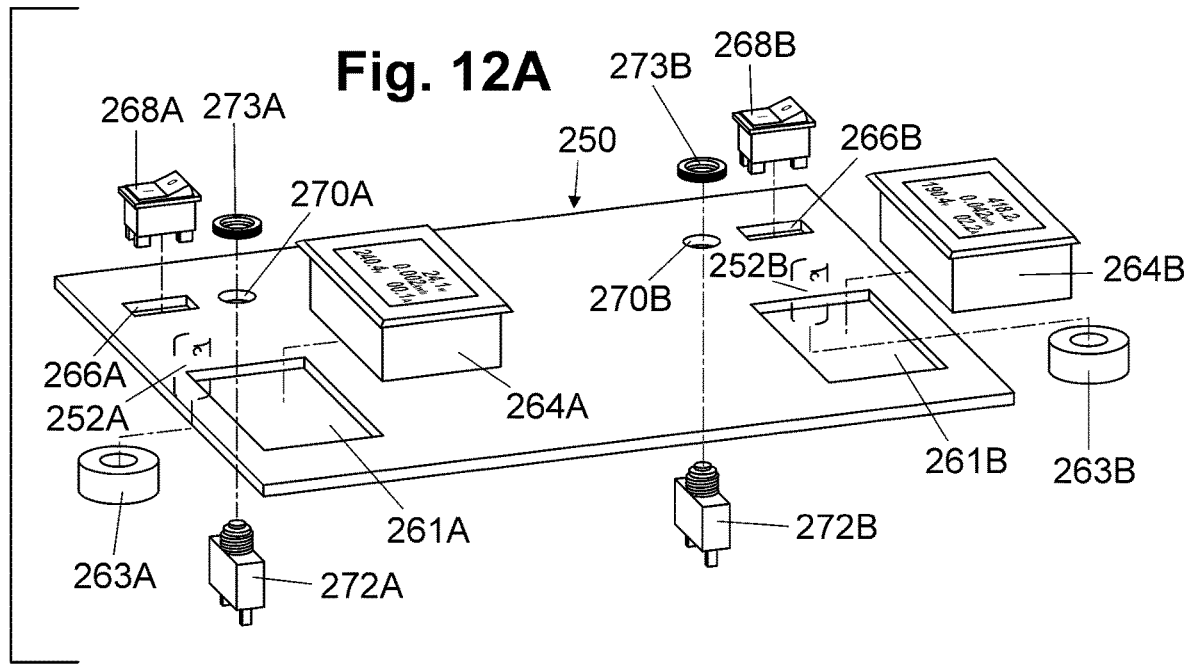
FIG. 12A shows an exploded, front right perspective view, according to one embodiment, of a lid of a circuit box with cutouts to accept insertion of a plurality of switches, meters, and popup breakers.

FIG. 12A shows an exploded, front right perspective view of the top lid 250 of the circuit box 410 as shown in FIG. 13A, according to one embodiment. In the top lid 250, a meter reader cutout 261A and 261B may allow for the insertion of the meter reader 264A and a meter reader 264B, respectively. A switch cutout 266A and 266B may allow for the insertion of the switch 268A and a switch 268B, respectively. A popup breaker cutout 270A and 270B may allow for the insertion of the popup breaker 272A and a popup breaker 272B secured by a washer 273A and 273B, respectively. A cylindrical step out 252A and 252B may extend from the bottom of the top lid 250 to hold a meter reader coil 263A and 263B, respectively, which may be used by the meter readers 264A and 264B, respectively, for displaying amperage.

Figure 12B:
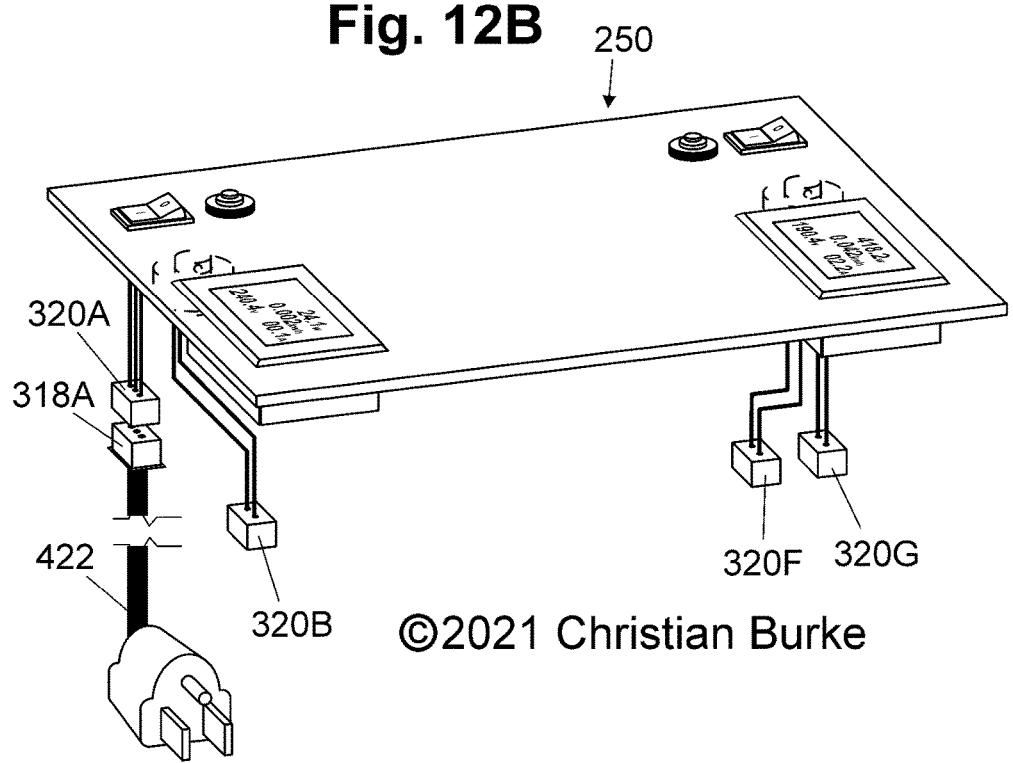
FIG. 12B shows a front, right perspective view of FIG. 12A, assembled, showing the lid of the circuit box with the switches, meters and popup breakers inserted into their respective cutouts, along with a plurality of male and female plugs that extend from its circuitry.

FIG. 12B shows an assembled, front right perspective view of the top lid 250 shown in FIG. 12A with various female plugs extending below, including plugs 320A and 320B, and a female plug 320F and 320G. Plug 320A connects to plug 318A, which may be connected to the input power cord 422 that, in turn, connects to a conventional power source (not shown).

FIG. 13A shows an exploded, front right perspective view of circuit box 410 in which its electrical circuit components reside, according to one embodiment. The input power cord 422 may be attached to plug 318A that, in turn, connects to plug 320A, which feeds alternating or direct current through the switch 268A, the popup breaker 272A, and the meter reader 264A in the top lid 250. From the meter reader 264A, current may pass to plug 320B that, in turn, passes current to plug 318B and through the bridge rectifier 312, and ultimately to the group of solid-state relays 311 that pulses and reverses current out to plug 318C. Plug 318C connects to plug 320C that feeds current via lead wires 56 to the bowl-shaped coated copper windings electromagnet 50M as shown in FIG. 2.

Next, current from about 1 volt to about 10 volts may be fed to plug 318D, which connects to plug 320D that, in turn, may feed current to the LED lights 328. Current from about 3 volts to about 32 volts may be fed to plug 320E that connects to plug 318E, which connects to the LDR assembly unit 160 containing LDRs 166A and 166B.

When light from LED lights 328 shines through timing wheel cutout 132L, as shown in FIG. 8A, onto LDR 166B, a current from about 3 volts to about 32 volts may pass through to the first half of the group of solid-state relays 311 to trigger current to pass through to the bowl shaped coated copper windings electromagnet 50M as shown in FIG. 2. When light shines through timing wheel cutout 132R, as shown in FIG. 8A, onto LDR 166A, a current from about 3 volts to about 32 volts may pass through to the second half of the group of solid-state relays 311 to trigger the current to reverse as it passes on to the bowl-shaped coated copper windings electromagnet 50M as shown in FIG. 2. In this way, reversing the direction of the pulsed direct current to the bowl-shaped coated copper windings electromagnet 50M repetitively changes the polarity of the inside bottom of the bowl-shaped coated copper windings electromagnet 50M as shown in FIG. 2.

Generated alternating current from the bowl-shaped coated copper windings generator coil 50G, as shown in FIG. 2, may travel up generator coil lead wires 54 into the circuit box 410 to a male plug 318F, which connects to plug 320F that feeds current through the switch 268B, the popup breaker 272B, the meter reader 264B, and out to plug 320G. Plug 320G may connect to a male plug 318G that, in turn, may connect to an output power cord 424. Alternatively, a conventional smoothing capacitor (not shown) may be added to smooth out the output current.

Plug 320D of the LED lights 328 may be inserted through a through opening 420 in the circuit box 410 and connected to plug 318D in the electric circuit 310. Plug 318E of the LDR assembly unit 160 may be fitted through the bottom of the circuit box 410 and connected to plug 320E of the electric circuit 310. The electric circuit 310 may be set down into the circuit box 410. All the plugs shown in FIG. 13A may be connected. The LED lights 328 may be set into a LED step out opening 414 in a circuit box step out 412 on the circuit box 410. While this embodiment shows one configuration of the electric circuit, other configurations would be apparent to those skilled in the art.

Figure 13B:
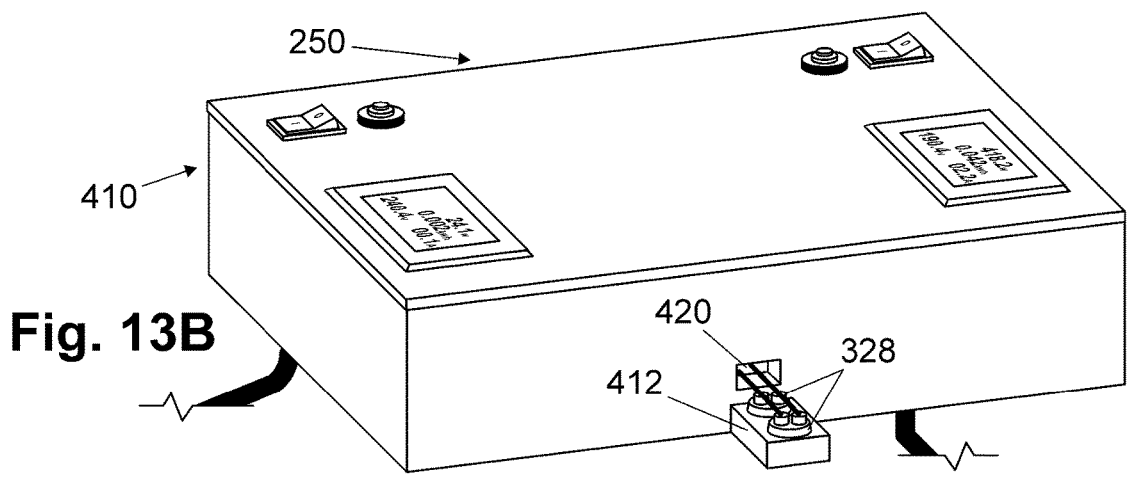
FIG. 13B shows a front right perspective view of FIG. 13A with the lid and circuit box assembled, and LED lights inserted into a circuit box step-out.

FIG. 13B shows a front right perspective view, assembled, of the top lid 250 as shown in FIG. 13A. The top lip 250 may be attached to the circuit box 410, the LED lights 328 may be set in place in the circuit box step-out 412. Plug 320D shown in FIG. 13A may be threaded through the through opening 420 to connect in the circuit box 410.

FIG. 14 shows a front right perspective view of a completed assembly, according to one embodiment. The circuit box 410 may be fixedly connected to the top of the exterior housing 100. The exterior housing 100 may be fixedly connected to a mounting unit 510. The output power cord 424 may extend out of the circuit box 410. The input power cord 422 may extend out of the circuit box 410 and plug into a conventional power source, inverter or battery system (not shown) or into an embodiment itself either directly or via a step-up transformer 512.

FIGS. 15A-15D show side views of examples of suggested applications for the use of various embodiments such as for recharging a battery backup generator as shown in FIG. 15A, for powering an electric car as shown in FIG. 15B, for powering an electric bicycle as shown in FIG. 15C, or for supplying electricity to meet the demands of a dwelling as shown FIG. 15D, The descriptions above of these exemplary embodiments are intended to be illustrative and not to limit the scope of the claims, as many alternatives, modifications, and variations will be apparent to those skilled in the art without departing from the spirit and scope of the present disclosure.

Operations

For operations, we may have an embodiment with the spheroidal shaped super magnet and axle rotor unit 20 with a north and south magnetic pole. We may also have the bowl-shaped coated copper windings electromagnet 501 for a stator that receives pulsed reversing direct current so that the polarity of the inside bottom of the bowl of the bowl-shaped coated copper windings electromagnet 50M reverses from north to south. When the south pole of the spheroidal shaped super magnet of the spheroidal shaped super magnet and axle rotor unit 20 reaches the bottom of the bowl, the current may be pulsed so that the bottom of the bowl is north. When the north pole of the spheroidal shaped super magnet of the spheroidal shaped super magnet and axle rotor unit 20 rotates to the bottom of the bowl of 50M, the current may be reversed so that the bottom of the bowl is south. The rapid pulsing of reversing current to the bowl-shaped coated copper windings electromagnet 50M rotates the spheroidal shaped super magnet and axle rotor unit 20 by repelling the spheroidal shaped super magnet. At the same time, the spheroidal shaped super magnet of the spheroidal shaped super magnet rotor unit 20 rotates within the bowl-shaped coated copper windings generator coil 50G, thereby producing alternating current.

There are many ways of pulsing and reversing direct current to the bowl-shaped coated copper windings electromagnet 50M, such as magnets attached to the axle 40 that trigger sensors such as conventional Hall effect sensors (not shown). According to one embodiment, the timing wheel 130 may fixedly connect to the axle 40 and may have two timing wheel cutouts 132L and 132R that allow light to shine through to the LDR assembly unit 160, which may be attached to the exterior housing 100 and reside within the interior perimeter of the timing wheel 130 as shown in FIG. 8A. The LED lights 328, as shown in FIG. 13A and FIG. 14, may be above the timing wheel 130. As the timing wheel 130 moves into position, the LED lights 328 may shine light through the timing wheel cutout 132L and onto the LDR 166B in the LDR assembly unit 160 as shown in FIG. 9A. This allows a pulse of current from about 3 to about 32 volts through to trigger a first half of the group of solid-state relays 311 in the circuit box 410 that pulses from as low as 110 volts but up to and including 400 volts of current to the bowl-shaped coated copper windings electromagnet 50M that, in turn, repels the spheroid shaped super magnet of the spheroid shaped super magnet and axle rotor unit 20.

When timing wheel cutout 132R on the timing wheel 130 moves into position, it may trigger LDR 166A to allow a pulse of current from about 3 to 32 volts through to trigger the second half of the group of solid-state relays 311 in the circuit box 410, thus reversing the current to the bowl-shaped coated copper windings electromagnet 50M. The light channel housing 144, as shown in FIG. 10A and FIG. 10B, may be added to help pinpoint the channeling of light to the LDRs 166A and 166B and to keep out outside light. It should be noted that, while voltage that an embodiment uses is high, in the range of about 110 volts to about 400 volts, it uses low amperage of about 1.0 amp to about 0.1 amps. It is the low amperage combined with a draw of current for only a fraction of a rotational cycle that creates an efficient embodiment.

According to one embodiment, the rotating of the spheroidal shaped super magnet within the bowl-shaped coated copper windings generator coil 50G may output alternating current. As shown in FIG. 14, the input power cord 422 may be plugged into a conventional 110-volt alternating current power source, into an inverter, or into a battery source (not shown) or into an embodiment itself. A step-up transformer 512 may be used to step up the current to 220 volts or higher, and the bridge rectifier 312, as shown in FIG. 11, may be used to convert the alternating current to direct current to feed the bowl-shaped coated copper windings electromagnet 50M.

According to one embodiment, direct current from a conventional battery through a conventional inverter (not shown) may be used to power the bowl-shaped coated copper windings electromagnet SOM. Alternatively step-up transformer 512 may be used to step up the current to 220 volts or higher. As shown in FIGS. 12A and 12B, switch 268A may be used to turn on current, pop up breaker 262A may be used for safety, meter reader 264A may be used, to display the current, and switch 268B may be used to turn on the output of alternating current from the bowl-shaped coated copper windings generator coil 50G, Pop breaker 262B may be used for safety along with meter reader 262B to display the output of alternating current.

While an embodiment may run on a self-contained loop, a stable source of current obtained from grid power or a battery may alternatively be used. Various electrical and battery configurations known by those skilled in the art may be used for this purpose and configured in such a way as to provide power for self-running electric modes of transportation or for dwellings as shown in FIGS. 15B-15C.

In addition, an embodiment may be suitable for a self-powered battery generator, comprising an inverter and larger and smaller batteries. The smaller battery or batteries may be configured to power an embodiment. The bowl-shaped coated copper windings generator coil 50G may be configured in such a way as to provide sufficient current to recharge the larger battery via the bowl-shaped coated copper windings generator coil 50G. Step-up and step-down devises may be used, as appropriate. The larger battery may then feed some of its current into the smaller battery that, in turn, may run the embodiment that recharges the larger battery or batteries.

CONCLUSION

With the benefit of the teachings described above, those skilled in the art will see that at least one embodiment of the present disclosure provides the advantage of a high ratio of output to input current capable of supplying electricity in a more efficient, reliable, economical, sustainable, and environmentally friendly way to meet the power demands of a growing world population.

Although the present disclosure has been described, above with reference to specific examples, those skilled in the art will appreciate that the present disclosure may be embodied in many other forms. Changes, variations, and modifications in the basic design may be made without departing from the inventive concept in the present disclosure. In addition, these changes, variations, and modifications would be obvious to those skilled in the art having the benefit of the foregoing teachings. All such changes, variations, and modifications are intended to be within the scope of the present disclosure. Thus, the scope of the embodiments should be determined by the claims set forth below rather than by the examples given.

DESCRIPTION OF REFERENCE NUMERALS 20 spheroidal shaped super magnet and axle rotor unit
22T first super magnet half-sphere
22B second super magnet half-sphere
24 shallow hole
26 support base dowel
28 support base hole
30 support base
32 slightly shaved portion
34 centered, deep rectangular recessed channel
40 axle
42 shallow recess
44 shaved axle portion
46 lynch pin hole
48 thread
50G bowl-shaped coated copper windings generator coil
50M bowl-shaped coated copper windings electromagnet
54 generator coil lead wire
56 electromagnet lead wire
60 interior support structure assembly unit
62 interior support structure
64 top section
66 recessed bowl
68 rounded recessed channel
70 stem
71 wire-threading through hole
72 corner through hole
74 bottom section
76 interior support structure center hole
78 diagonal recessed channel
80 corner hole
82 dovetail
84 shallow recessed channel
90 corner support
92 curved side
94 corner support ventilation through hole
96 corner support recessed hole
99 exterior housing half
100 exterior housing
101 exterior housing face
102 centered circular protrusion
103 centered circular recess
104 exterior housing center hole
108 center recess
110 exterior housing recess
114 ventilation opening
116 mortise
120 ring ball bearing
122 axle sleeve
124 axle sleeve through hole
130 timing wheel
132 timing wheel cutout
134 timing wheel through hole
136 thin outside perimeter wall
140 lynch pin
142 end cap
144 light channel housing unit
146 back side
148 flap
150 tapered through hole
160 light dependent resistor (LDR) assembly unit
162 light dependent resistor (LDR) assembly unit channel
164 light dependent resistor (LDR) recess
166 light dependent resistor (LDR)
168 light dependent resistor (LDR) wire
210 attachment dowel
250 top lid
252 cylindrical step out
261 meter reader cutout
263 meter reader coil
264 meter reader
266 switch cutout
268 switch
270 popup breaker cutout
272 popup breaker
273 washer
310 electric circuit
311 group of solid-state relays
312 bridge rectifier
318 male plug
320 female plug
328 LED light
410 circuit box
412 circuit box step-out
414 LED step-out opening
420 through opening
422 input power cord
424 output power cord
510 mounting unit
512 step-up transformer

I claim:

1. An electric motor-generator comprising:
a bowl-shaped coated copper windings electromagnet;
a bowl-shaped coated copper windings generator coil;
a spheroidal shaped super magnet and axle rotor unit comprising one or a plurality of super magnets assembled together to form an approximately spheroidal shaped super magnet fixedly connected around an axle; and,
an electric circuit configured in such a way as to repetitively pulse and reverse direct current to the bowl-shaped coated copper windings electromagnet and having a means to connect to a power source,
wherein the approximately spheroidal shaped super magnet of the spheroidal shaped super magnet and axle rotor unit resides within the cavities of both the bowl-shaped coated copper windings electromagnet and the bowl-shaped coated copper windings generator coil,
wherein the bowl-shaped coated copper windings electromagnet is configured in such a way as to repetitively repel the approximately spheroidal shaped super magnet when pulsed reversing direct current is applied, and,
wherein the approximately spheroidal shaped super magnet is configured in such a way as to rotate within the cavities of both the bowl-shaped coated copper windings electromagnet and the bowl-shaped coated copper windings generator coil,
whereby alternating current is produced.

2. The electric motor-generator of claim 1, wherein the approximately spheroidal shaped super magnet further comprises one or a plurality of rare earth metal materials such as neodymium.

3. The electric motor-generator of claim 1, wherein the axle of the spheroidal shaped super magnet and axle rotor unit further comprises a nonferrous metal material such aluminum or titanium.

4. The electric motor-generator of claim 1 further comprising a support base comprising a highly ferrous metal such as iron or steel, fixedly attached to the axle, and configured in such a way as to structurally support the plurality of super magnets of the spheroidal shaped super magnet and axle rotor unit.

5. The electric motor-generator of claim 1 further comprising a first and second interior support structure comprising a nonferrous material and configured in such a way as to supportively contain the bowl-shaped coated copper windings electromagnet and the bowl-shaped coated copper windings generator coil, respectively.

6. The electric motor-generator of claim 5 further comprising an exterior housing configured in such a way as to supportively contain the first and second interior support structures with the bowl-shaped coated copper windings electromagnet and the bowl-shaped coated copper windings generator coil, respectively, and the spheroidal shaped super magnet and axle rotor unit.

7. The electric motor-generator of claim 6 further comprising a plurality of rotor bearings supportively held by the exterior housing and configured in such a way as to support the rotation of the axle of the spheroidal shaped super magnet and axle rotor unit.

8. The electric motor-generator of claim 1, wherein the bowl-shaped coated copper windings electromagnet further comprises from about 300 to about 10,000 approximately horizontal windings of 18 to 24 AWG coated copper wire, the number of windings determined by a desired use.

9. The electric motor-generator of claim 1, wherein the bowl-shaped coated copper windings generator coil further comprises one or a plurality of wires having from about 300 to about 10,000 horizontal windings of 18 to 24 AWG coated copper wire wound for one or a plurality of current outputs to support a desired voltage output.

10. The electric motor-generator of claim 1, wherein the electric circuit is connected to the power source.

11. The electric motor-generator of claim 10, wherein voltage from the power source to the electric circuit is stepped up to between about 120 volts to about 400 volts.

12. An electric motor-generator comprising:
a bowl-shaped coated copper windings electromagnet;
a bowl-shaped coated copper windings generator coil;
a spheroidal shaped super magnet and axle rotor unit comprising one or a plurality of super magnets assembled together to form an approximately spheroidal shaped super magnet fixedly connected around an axle, the axle comprising a nonferrous metal material such aluminum or titanium;
an electric circuit configured in such a way as to repetitively pulse and reverse direct current to the bowl-shaped coated copper windings electromagnet and having a means to connect to a power source;
a plurality of rotor bearings configured in such a way as to support the rotation of the axle of the spheroidal shaped super magnet and axle rotor unit;
a first and second interior support structure comprising a nonferrous material and supportively containing the bowl-shaped coated copper windings electromagnet and the bowl-shaped coated copper windings generator coil, respectively;
an exterior housing supportively holding the rotor bearings and configured in such a way as to house the spheroidal shaped super magnet and axle rotor unit and supportively contain the first and second interior support structures with the bowl-shaped coated copper windings electromagnet and the bowl-shaped coated copper windings generator coil, respectively; and,
a support base comprising a highly ferrous metal such as iron or steel, fixedly attached to the axle, and configured in such a way as to structurally support the plurality of super magnets of the spheroidal shaped super magnet and axle rotor unit,
wherein the approximately spheroidal shaped super magnet resides and rotates within both cavities of the bowl-shaped coated copper windings electromagnet and the bowl-shaped coated copper windings generator coil,
wherein the bowl-shaped coated copper windings electromagnet is configured to repetitively repel the approximately spheroidal shaped super magnet of the spheroidal shaped super magnet and axle rotor unit when repetitively pulsed and reversing direct current is applied,
wherein the approximately spheroidal shaped super magnet of the spheroidal shaped super magnet and axle rotor unit comprises one or a plurality of rare earth metal materials such as neodymium and is configured in such a way as to rotate within the cavity of the bowl-shaped coated copper windings generator coil,
whereby alternating current is produced.

13. An electric motor-generator comprising:
a bowl-shaped coated copper windings electromagnet comprising from about 300 to about 10,000 approximately horizontal windings of 18 to 24 AWG coated copper wire, the number of windings determined by a desired use;
a bowl-shaped coated copper windings generator coil comprising one or a plurality of wires having from about 300 to about 10,000 approximately horizontal windings of 18 to 24 AWG coated copper wire wound for one or a plurality of current outputs to support a desired voltage output;
a spheroidal shaped super magnet and axle rotor unit comprising one or a plurality of super magnets assembled together to form an approximately spheroidal shaped super magnet fixedly connected around an axle, the axle comprising a nonferrous metal material such aluminum or titanium;
an electric circuit configured in such a way as to repetitively pulse and reverse direct current to the bowl-shaped coated copper windings electromagnet and having a means to connect to a power source;
a plurality of rotor bearings configured in such a way as to support the rotation of the axle of the spheroidal shaped super magnet and axle rotor unit;
a first and second interior support structure comprising a nonferrous material and supportively containing the bowl-shaped coated copper windings electromagnet and the bowl-shaped coated copper windings generator coil, respectively; and,
an exterior housing supportively holding the rotor bearings and configured in such a way as to house the spheroidal shaped super magnet and axle rotor unit and supportively contain the first and second interior support structures with the bowl-shaped coated copper windings electromagnet and the bowl-shaped coated copper windings generator coil, respectively,
wherein the approximately spheroidal shaped super magnet resides and rotates within both cavities of the bowl-shaped coated copper windings electromagnet and the bowl-shaped coated copper windings generator coil,
wherein the bowl-shaped coated copper windings electromagnet is configured to repetitively repel the approximately spheroidal shaped super magnet of the spheroidal shaped super magnet and axle rotor unit when repetitively pulsed and reversing direct current is applied, wherein the electric circuit is connected to the power source, and voltage from the power source to the electric circuit is stepped up to between about 120 volts to about 400 volts, and, wherein the approximately spheroidal shaped super magnet of the spheroidal shaped super magnet and axle rotor unit comprises one or a plurality of rare earth metal materials such as neodymium and is configured in such a way as to rotate within the cavity of the bowl-shaped coated copper windings generator coil, whereby alternating current is produced.

14. A method for generating electrical current utilizing an electric motor-generator, the electric motor-generator comprising:

a bowl-shaped coated copper windings electromagnet;

a bowl-shaped coated copper windings generator coil;

a spheroidal shaped super magnet and axle rotor unit comprising one or a plurality of super magnets assembled together to form an approximately spheroidal shaped super magnet fixedly connected around an axle, the axle comprising a nonferrous metal material such aluminum or titanium;

an electric circuit configured in such a way as to repetitively pulse and reverse direct current to the bowl-shaped coated copper windings electromagnet and having a means to connect to a power source;

a plurality of rotor bearings configured in such a way as to support the rotation of the axle of the spheroidal shaped super magnet and axle rotor unit;

a first and second interior support structure comprising a nonferrous material and supportively containing the bowl-shaped coated copper windings electromagnet and the bowl-shaped coated copper windings generator coil, respectively; and, an exterior housing supportively holding the rotor bearings and configured in such a way as to house the spheroidal shaped super magnet and axle rotor unit and supportively contain the first and second interior support structures with the bowl-shaped coated copper windings electromagnet and the bowl-shaped coated copper windings generator coil, respectively, wherein the approximately spheroidal shaped super magnet resides and rotates within both cavities of the bowl-shaped coated copper windings electromagnet and the bowl-shaped coated copper windings generator coil, wherein the howl-shaped coated copper windings electromagnet is configured to repetitively repel the approximately spheroidal shaped super magnet of the spheroidal shaped super magnet and axle rotor unit when repetitively pulsed and reversing direct current is applied, wherein the approximately spheroidal shaped super magnet of the spheroidal shaped super magnet and axle rotor unit comprises one or a plurality of rare earth metal materials such as neodymium and is configured in such a way as to rotate within the cavity of the bowl-shaped coated copper windings generator coil, whereby alternating current is produced.

* * * * *